(12) United States Patent
Knudsen

(10) Patent No.: US 8,109,006 B2
(45) Date of Patent: Feb. 7, 2012

(54) POST SLEEVE POSITIONING APPARATUS AND METHOD

(76) Inventor: N. Eric Knudsen, Maple Valley, WA (US)

( * ) Notice: Subject to any disclaimer, the term of this patent is extended or adjusted under 35 U.S.C. 154(b) by 0 days.

(21) Appl. No.: 13/117,989

(22) Filed: May 27, 2011

(65) Prior Publication Data

US 2011/0252658 A1 Oct. 20, 2011

Related U.S. Application Data

(63) Continuation of application No. 12/976,776, filed on Dec. 22, 2010, now Pat. No. 7,966,740, which is a continuation of application No. 12/403,985, filed on Mar. 13, 2009, now Pat. No. 7,861,434.

(51) Int. Cl.
*G01B 5/25* (2006.01)

(52) U.S. Cl. ............................. 33/613; 33/485

(58) Field of Classification Search .................... 33/1 H, 33/483, 485, 613, 645
See application file for complete search history.

(56) References Cited

U.S. PATENT DOCUMENTS

| | | | |
|---|---|---|---|
| 4,479,342 A | 10/1984 | Eberle | 52/742 |
| 5,491,905 A * | 2/1996 | Jablonski et al. | 33/613 |
| 6,293,028 B1 | 9/2001 | Sylvia | 33/613 |
| 6,658,753 B2 | 12/2003 | Tatarnic | 33/613 |
| 6,860,029 B2 | 3/2005 | Haynes | 33/645 |
| 7,069,160 B2 | 6/2006 | Cecil | 702/59 |
| 7,377,489 B1 * | 5/2008 | Houseman | 33/645 |
| 7,484,311 B2 * | 2/2009 | Bommarito | 33/613 |
| 7,689,384 B1 | 3/2010 | Becker | 702/188 |
| 7,726,037 B1 | 6/2010 | Jordan | 33/613 |
| 7,861,434 B2 | 1/2011 | Knudsen | 33/613 |
| 7,966,740 B2 | 6/2011 | Knudsen | 33/613 |
| 2004/0255481 A1 | 12/2004 | Haynes | 33/645 |
| 2005/0005468 A1 * | 1/2005 | Wixey | 33/613 |
| 2007/0119067 A1 | 5/2007 | Mackey | 33/613 |
| 2009/0119941 A1 | 5/2009 | Sentz | 33/755 |

\* cited by examiner

*Primary Examiner* — G. Bradley Bennett
(74) *Attorney, Agent, or Firm* — Seed IP Law Group PLLC

(57) ABSTRACT

A post sleeve installation device includes a standing structure, a structure coupled to the standing structure and configured to support a post sleeve below the standing structure, and a mechanism configured to enable selective translation of the support structure in three axes and rotation around a vertical axis. Locks are provided to lock the post sleeve at a selected position and orientation relative to the standing structure. A beam extending from one installation device to another measures or controls the relative spacing, orientation, and elevation of associated post sleeves, and related data is collected for off-site manufacture of fence panels. Additionally, a repository is provided, to which the data is transmitted for retention, and from which the data can be retrieved for manufacture of replacement fence panels.

23 Claims, 13 Drawing Sheets

POST SLEEVE POSITIONING APPARATUS AND METHOD

CROSS-REFERENCE TO RELATED APPLICATION

This application is a continuation of U.S. patent application Ser. No. 12/976,776, filed Dec. 22, 2010, now pending, which application is a continuation of U.S. patent application Ser. No. 12/403,985, filed Mar. 13, 2009, now issued as U.S. Pat. No. 7,861,434, where these applications are incorporated herein by reference in their entireties.

BACKGROUND OF THE INVENTION

1. Technical Field

The disclosed embodiments relate in general to systems for positioning fence posts in ground inserts, or post sleeves, that receive such posts, and in particular to systems for accurately and repeatably positioning post sleeves relative to the surrounding terrain and/or adjacent post sleeves.

2. Description of the Related Art

Fences are ubiquitous in modern society, used in a vast range of applications, to mark and accent boundaries, provide security, and control movement of people and animals. Thousands of miles of new and replacement fences are installed every year in the U.S., and utilize vast amounts of construction related natural resources.

FIG. 1 shows a landscape with a fence 100 extending along portions thereof. The fence 100 shown in FIG. 1 comprises two major segments, or runs 102. A run is a section or portion of a fence that extends between natural dividing points such as corners, gates, buildings, etc. Except where a fence is attached to a building, each run 102 generally has a main post 104a at each end and line posts 104 spaced between the main posts. Each pair of adjacent posts 104 has a fence panel 106 coupled between them. Each panel 106 comprises horizontal elements, or rails 108, and vertical elements, or fence boards 110.

Typically, fence construction and installation involves a number of steps. In some cases, a site survey is done to determine the precise location of the fence and to prevent the all-too-common (and potentially very expensive) occurrence of installing a fence a few inches or feet beyond the actual property line. A contractor visits the site to estimate the materials and labor required to build and install the fence. In addition to simply measuring linear feet required, elements such as topography and obstructions must be reviewed and accounted for. If the fence location has not been marked by the owner or surveyor, the contractor may mark the location during the initial visit, or during a later visit. Installation is scheduled, and materials are ordered and delivered to the site.

Depending on the scope of the project, the locations and spacing of the fence posts may be determined and laid out in advance, by a landscape architect, for example, or left to the installation crew to determine on site. In either case, the spacing of the posts is limited by the material available, and typically is selected to make best use of that material. For example, 96 inch lumber is commonly used to frame wooden fences, so the maximum distance between posts cannot exceed 96 inches. On the other hand, if the contractor uses 96 inch lumber, it would be wasteful to set the posts 60 inches apart, which would result in about three feet of waste from every framing rail. However, because of other considerations, some waste is unavoidable. It is generally preferable to evenly space the posts of a given run of fence, to provide an attractive and unified appearance. Inasmuch as such a run will rarely be evenly divisible by eight feet, each post will be something less than eight feet apart. Additionally, if the terrain includes changes in elevation which the bottom and or top rail must follow, the length of the angled framing rails between two posts that are at different heights may be much greater than the lateral distance between the posts, which reduces the maximum permissible horizontal distance between any of the posts of that run. Furthermore, it can be difficult, or at least time consuming, to precisely position a post to within a fraction of an inch, so a margin of an inch or two is generally provided. Thus, the posts may be spaced anywhere from a couple of inches to a couple of feet less than the maximum allowable distance. Finally, when building fences from natural materials such a wood, it is not uncommon for individual pieces to be unsuitable, because of, for example, a knot in a position that unacceptably weakens a part, or an excessively warped board, etc. For all of these reasons, some material waste is expected and allowed for in the original estimate when calculating the materials for the frame rails, and, for similar reasons, when calculating materials for fence boards and posts.

Once the materials and crew are at the site, and with post locations marked, the post holes are dug, and the posts are installed. Each post hole may be partially backfilled with gravel to improve drainage, and the post is then stood in the hole and held in place by several stakes driven into the ground around the post and braces of scrap lumber nailed to the stakes and the sides of the post. A concrete footing is poured into the hole around the post and allowed to set, and the stakes are later removed. With all the posts in place and the footings set sufficiently to remove the braces, frame rails are cut to fit, and attached to the posts, extending between adjacent posts along the bottom and top of the fence. Fence boards are then cut to length and attached to the frame rails. Perfectly parallel and consistently spaced fence boards along the entire fence run is important, because differences in spacing will become very obvious to an observer when there is daylight behind the fence. Because of variations in the spacing of the posts, it is often necessary to rip fence boards lengthwise to maintain the correct spacing in some of the panels of a fence run. Additionally, the lengths of the fence boards may vary considerably. For example, the ground line between posts can have obstructions or changes in elevation that the installer adjusts for in the length of the fence boards in order to maintain a straight line at the top of the fence while still maintaining proper spacing or ground clearance at the bottom. Additionally, many fences include decorative features along the top, such as arches or waves, in which case the builder may extend the fence boards above the desired finish line, and cut the fence boards to follow the desired shape, after installation. The posts are also cut down to the final length after installation, and post caps or finials are often attached to the tops. After the fence is installed, it is usually painted or stained to protect the wood and extend its useful life.

If properly executed using good quality material, a fence that is built and installed as described above can be very attractive, and can last for many years. However, it will be noted that there is a significant amount of waste that is produced. Not only does such waste result in higher material costs, it increases shipping costs because it must be transported to the site and later removed, it increases landfill use, and fees, and wastes otherwise valuable resources.

In view of the expense, labor, and waste associated with installing a fence that is custom-built on site, another method of building and installing fences has been introduced. Pre-manufactured fence panels are becoming more available, and increasingly can be found in a wide variety of materials, including wood, vinyl, composite, aluminum, steel, concrete etc., and in a wide variety of designs.

Pre-manufactured panels or kits are typically sold from retail lumber and hardware outlets. The panels and kits are provided in standard sizes and are ready for installation. One common panel size, of the many available, is six feet tall by eight feet long. The installer digs the post holes at intervals of eight feet plus the width of a fence post, and places the first post, with stakes and braces to hold it plumb while the concrete sets, as described above. However, the installer also attaches the first fence panel to the post, and may attach the second post to the first panel at the same time, installing both posts together. The installer then progresses post-by-post, attaching a panel between each pair of posts before pouring the footing around the second of the pair, bracing each post and shimming up each panel to ensure that the post is held plumb and the fence level until the post footings are sufficiently hardened, which may be several days because of the mass of the fence being supported. This process ensures that the spacing between the posts is correct for the eight-foot panels. At the end of a fence run, if the last post is less than eight feet from the previous one, the installer cuts a fence panel to fit in the remaining space. Alternatively, the installer may install all of the posts first, but this requires significant care to ensure that the distance between the posts is exactly correct. Otherwise, it may be necessary to trim the panel to fit, or shim the post to fill a gap.

In contrast to site built fencing, pre-manufactured fence panels can be produced efficiently, inexpensively, and at a consistent, predictable quality. Because they are produced in a manufacturing facility, waste can be significantly reduced, and the waste that is produced is more likely to be recycled either internally to produce other products or externally rather than sent to a landfill. Material handling methods and automated machines for material optimization allow utilization of all lengths of raw materials. The factory can obtain lumber that has not been cut to standard lengths, but is the full length of the log, or stem, from which it was milled. Scrap that won't work on one fence panel or design can be diverted and used for another. Flaws and defective lumber can be detected automatically, and can often be cut out, allowing the remaining material to be salvaged. This optimization and defective-material/scrap management process is much more environmentally friendly than site-built fence processes, especially as it relates to reducing the production, and increasing the productive recycling, of waste lumber. As tree trunks don't come in perfect length increments, the factory can bring in material in lengths determined by the actual tree trunks and optimize those random lengths via computer to best utilize the material, and minimize waste. The panels can be primed or finished in spray booths or dip tanks in large volumes, using better quality control, wasting less material, and reducing or eliminating the environmental impact that arises from on-site finishing.

Overall, fences built using pre-manufactured fence panels can be made more efficiently, less expensively, and to higher and more consistent quality standards, with less waste and less environmental impact, than fences custom-built on site.

Optimization systems are commonly used in the lumber industry at various stages between the forest and the finished product, to maximize the yield of salable lumber from each stem. For example, in a sawmill, stems are cut into boards of various thicknesses for curing. After curing, the boards are carried by automatic machinery through a series of scanners of various types, to detect defects such as knots, checks, bow, warp, wane, etc. The system determines where to cut the boards for the best yield according to various criteria. For example, a rough board might be wide enough to cut a 2×12 board from, which, because of some minor knots and wane, would be graded as 2-and-better. However, if cut differently, the same rough board might also yield one 2×6 board of select grade and one 2×4 board of economy grade. If the optimization system is programmed to select for the best financial yield, and if the programmed market value of the 2×12, 2-and-better board is less than the combined market value of the 2×6, select, and 2×4, economy boards, the optimizer system will automatically cut the rough board into the 2×6 and 2×4 boards, which results in more material waste, but more profitability for the mill. On the other hand, if the system is programmed to select for greatest material yield, the system will cut the rough board into the 2×12 size.

Another criterion that is commonly used in the optimization process is length, because the dimensional retail lumber market heavily prefers lengths that are 8 feet and longer, whereas the fence board market prefers 5 and 6 foot long 1×6 nominal fence boards, with a heavy preference for the 6 foot lengths. Most retail outlets offer dimensional lumber, e.g., 2×4, 2×6, and 2×8, in 8, 10, and 12 foot lengths, but do not sell shorter lengths. Even with optimization, sawmills inevitably produce some lumber that is shorter or narrower than these desired lengths or widths. With regards to fence boards, at present, there is some commercial market for 5 foot lengths, but almost none for shorter lengths. Because there is very little market for these "mill shorts," they are typically scrapped or sold at very low cost.

Some manufacturers of pre-manufactured fence panels have begun to produce fence designs that make greater use of mill shorts in order to exploit the relative abundance and low cost of the material. For example, the panels of the fence 100 of FIG. 1 are of a 6 foot horizontal lattice-top design sold by the Copper River Fence Co., in which most of the fence board material is cut from lengths that are shorter than 5 feet, which is shorter than the typical fence board retail market can effectively stock and sell.

BRIEF SUMMARY

According to various embodiments, systems and methods related to production and installation of fences, fence posts, and post sleeves for supporting fence posts are provided. According to an embodiment, an installation system is provided, comprising a standing structure having a plurality of legs, a support structure coupled to the standing structure and configured to support a post sleeve below the standing structure, and a translation control mechanism configured to enable selective translation of the support structure along first and second horizontal axes, and a vertical axis, relative to the standing structure. Additionally, a rotation mechanism is provided to permit orientation adjustment of the post sleeve, relative to the standing structure. The standing structure is configured to be leveled so as to support the post sleeve in a vertically plumb position, and Locking mechanisms are provided that can prevent translation of the support structure.

According to various embodiments, means are provided for controlling or measuring distance, angle and elevation of one post sleeve from another. According to an embodiment, data collection methods are provided for collecting data from the installation system, and for transmitting the data to a central repository, from which the data can be retrieved for manufacture of fence panels.

A manufacturing process is provided, according to an embodiment, for manufacturing made-to-order fence systems using mass-production methods and optimizing processes.

DETAILED DESCRIPTION

The processes and embodiments that are described hereafter are to be understood as referring to examples that can be subject to a considerable degree of variation without departing from the scope of the invention.

Figure 1:
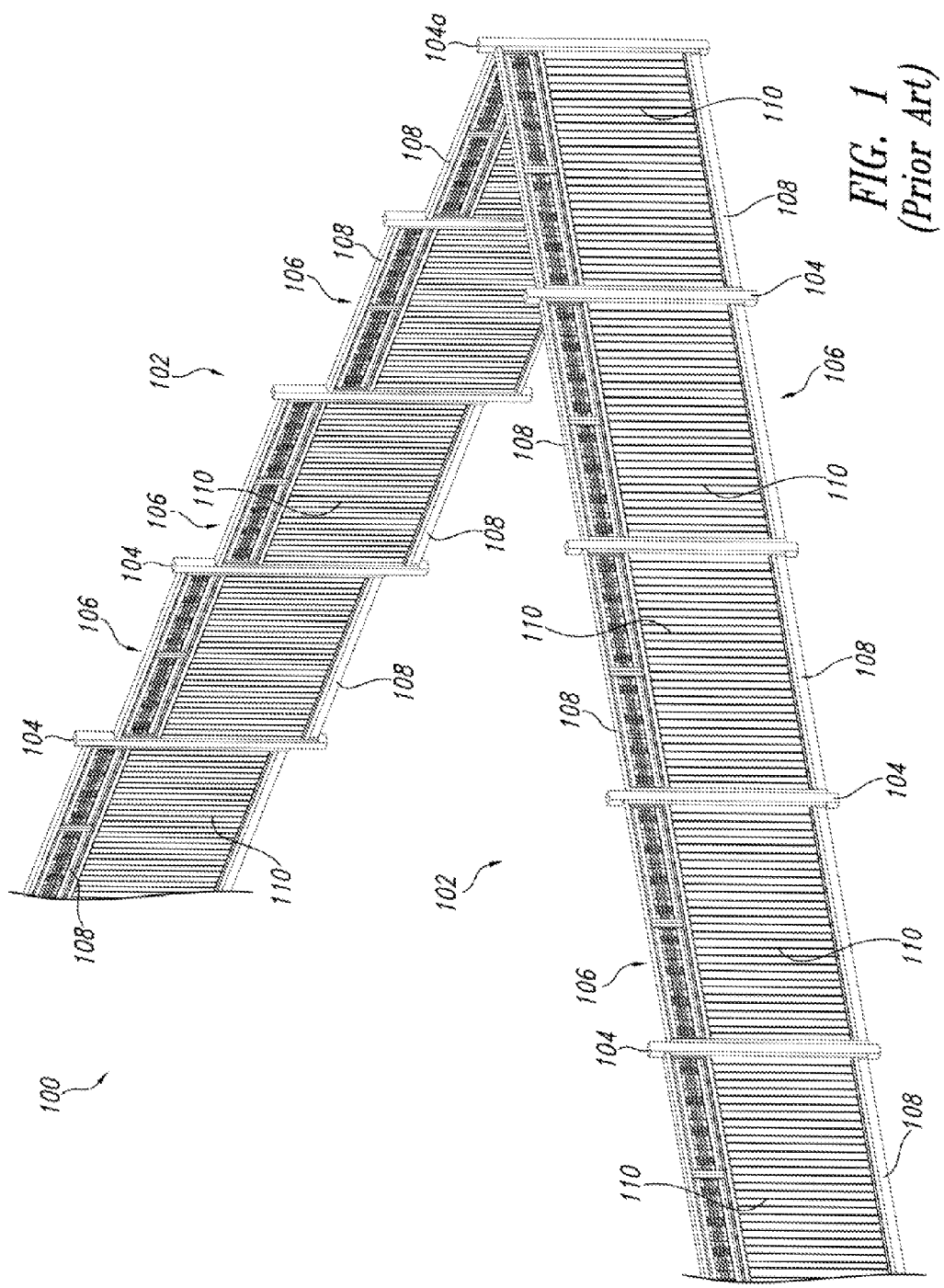
FIG. 1 shows a landscape with a fence.

As noted above, pre-manufactured fence panels provide a number of benefits over conventional site-built fences. Nevertheless, they are not widely used, especially by commercial fence builders. A fundamental problem that prevents wider adoption of pre-manufactured fence panels is that they are not manufactured for specific locations, but are made to standard sizes, so the user does not have the option of using non-standard post spacing. Because the spacing must conform to a standard, a short panel is almost always required at one of the ends of a run, which can detract from the appearance of the finished fence and add to the waste factor. Additionally, a typical pre-manufactured fence panel can only be installed to extend perpendicular to a vertical post, so it cannot follow a change in elevation. The installer is obliged to stair-step the panels, as illustrated in the run 102a of FIG. 1, rather than "racking" the rectangular shape to become a parallelogram roughly following the topography. Furthermore, stair stepping generally results in a gap under the fence at the low side of each panel, which may require that some extension be added to the bottoms of the panels to fill the gaps. These options may not be acceptable to the end user. Finally, commercial installers generally find it more efficient to install all of the posts first, then install the fence boards. However, because of the difficulty in spacing and elevating the posts with sufficient accuracy for pre-manufactured panels, and the resulting extra expense entailed in more careful spacing, or reworking a panel when the spacing is not correct, commercial fence contractors often avoid pre-manufactured fence panels.

The inventor has recognized that if a more reliable and efficient mechanism were available for accurately positioning fence posts during installation, pre-manufactured fence panels would be more widely acceptable. Additionally, if custom fence panels could be built in a factory setting, they would benefit from many of the same advantages that are associated with the pre-manufactured panels, which are currently available only in standard styles and sizes.

According to an embodiment, a system is provided for selectively positioning post sleeves in the ground, each sleeve being configured to receive a respective fence post. Post sleeves are disclosed, for example, in U.S. patent application Ser. No. 12/163,506, filed Jun. 27, 2008, and entitled "Post Sleeve Assembly," which application is incorporated herein by reference in its entirety. Post sleeves are devices that are configured to be permanently fixed in the ground at the location of a fence or sign post, and into which the post is later positioned. Once a post sleeve is set in the ground, the precise position and depth of the post is fixed, and therefore the relative positions and orientations of adjacent posts are also fixed, by respective post sleeves, before the posts are emplaced. Accordingly, the dimensions of a fence panel that is to be installed between two adjacent posts can be determined, from the relative positions and orientation of the post sleeves, to a degree sufficient to manufacture the panel offsite, with confidence that the panel will properly fit between the posts that are eventually placed in the sleeves. Finally, if the position and orientation of the post sleeves of a fence can be adequately controlled during installation, the dimensions of each of the fence panels can be planned in advance, so that the posts and fence panels can be ready for installation when the post sleeves are installed.

Figure 2:
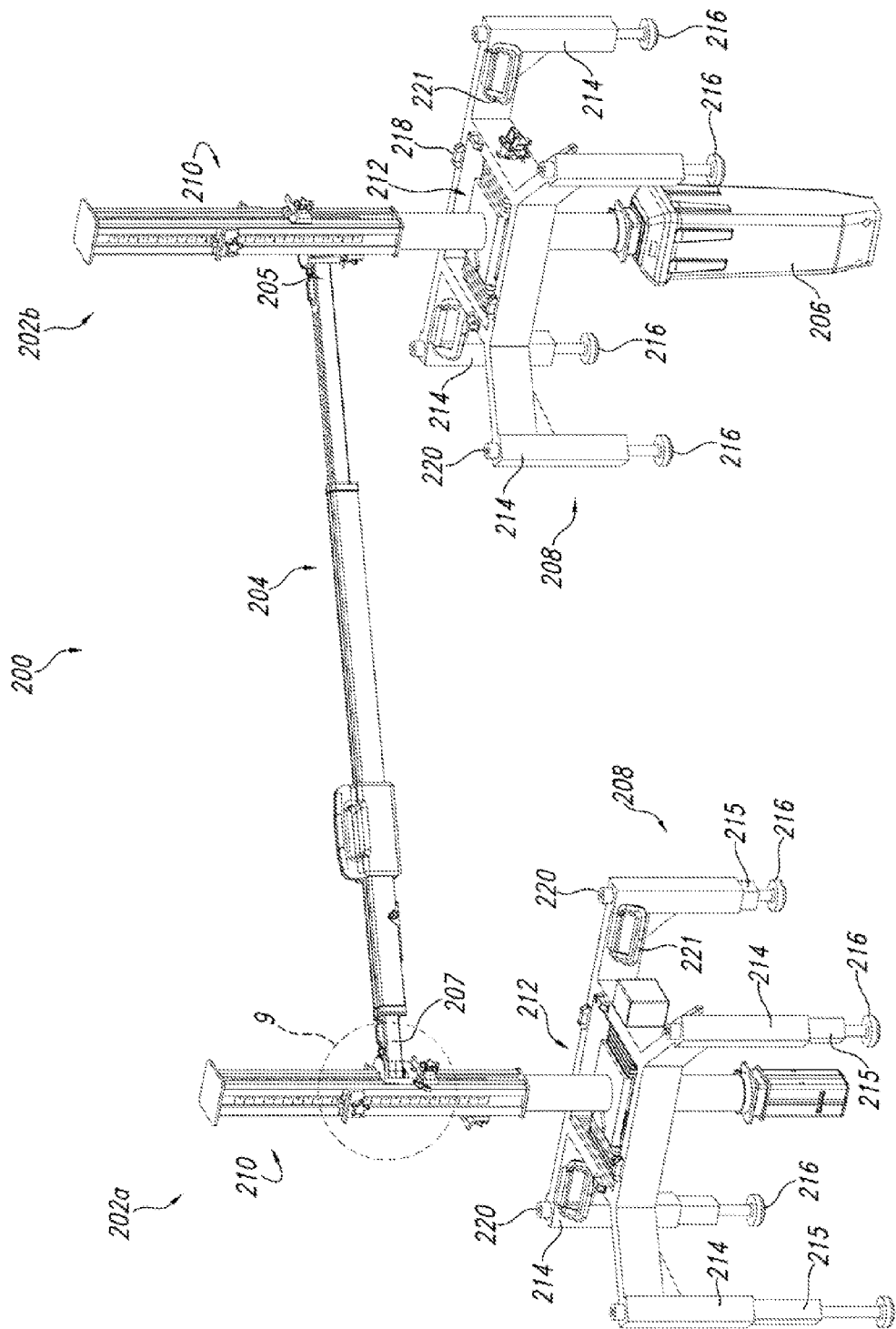
FIG. 2 shows a post sleeve positioning system according to an embodiment, including a pair of post sleeve installation devices and a spacing beam.

FIG. 2 shows a post sleeve positioning system 200 according to one embodiment. The system 200 includes a plurality of post installation devices, or "spider frames" 202a, 202b, and a spacing beam 204 having first and second ends 205, 207. Hereafter, except where it is necessary to distinguish between spider frames 202a and 202b of FIG. 2, they will be referred to simply by reference number 202.

Each spider frame 202 is configured to suspend a post sleeve 206 in a post hole in a position that is minutely adjustable in three axes and around a longitudinal axis. The spacing beam 204, when coupled to extend between two spider frames 202 supporting respective post sleeves, is configured to determine or control the relative positions and orientations of the post sleeves 206.

Using at least two spider frames 202 and a spacing beam 204, a user can install post sleeves in preselected positions, relative to each other, well within acceptable tolerances for installation of pre-manufactured fence panels. By leapfrogging two or more spider frames 202, as will be described later in more detail, a user can similarly install any number of post sleeves.

Each spider frame 202 comprises a leg assembly 208, a column assembly 210, and a position assembly 212. The leg assembly 208 supports the spider frame 202 and includes a plurality of legs 214 with adjustable feet 216 by which the spider frame 202 can be positioned exactly level over a post hole, regardless of the terrain. According to an embodiment, as shown on the spider frame 202a, the legs 214 each include an inner telescoping sleeve 215 to accommodate extreme slopes. Spirit vials 218 are attached to an upper surface of the leg assembly 208 to facilitate leveling. Adjustment knobs 220 at the top of each leg 214 are coupled to an extension mechanism of the respective leg. Using a standard cordless drill with a driver insert, the user can engage a socket provided in each knob 220 to adjust the length of the respective leg 214. Rotation of the knob 220 in one direction, e.g., clockwise, extends the respective foot 216 and lengthens the leg, while rotation of the knob in the opposite direction retracts the foot 216 and shortens the leg. The knobs can also be manually rotated. According to an alternate embodiments, motors or actuators are provided in the spider frame to control the leg lengths. Handles 221, shown on spider frame 202, are provided to simplify moving and lifting of the spider frame. According to an embodiment, at least two of the legs 214 are provided with lockable wheels to permit a single installer to move the spider frame "wheelbarrow" style.

Figure 3:
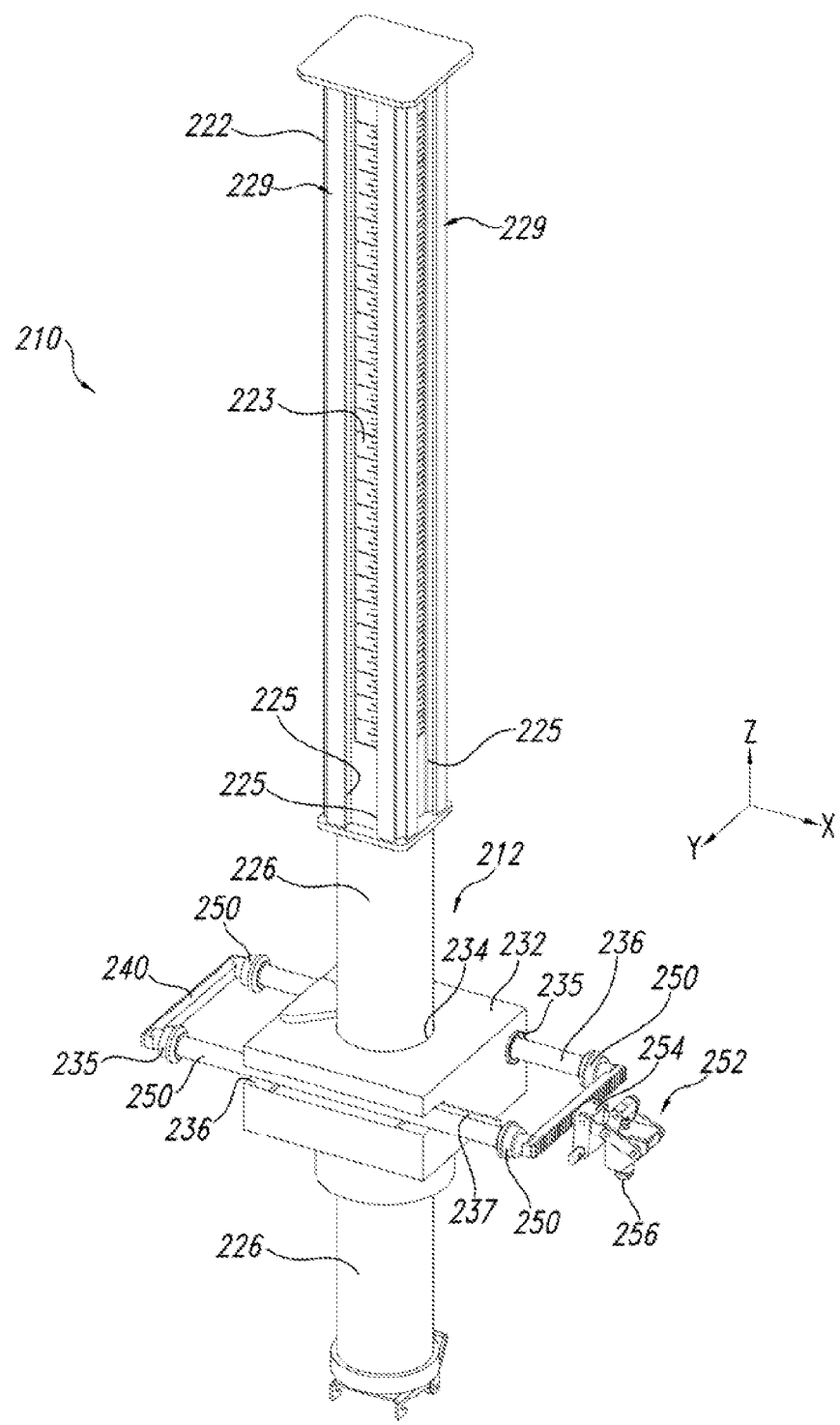
FIG. 3 shows a plan view of elements of one of the post sleeve installation devices of FIG. 2, showing position control and lock mechanisms for x, y, and z axes and orientation.

Turning now to FIG. 3, the column assembly 210 and portions of the position assembly 212 are shown. The position assembly 212 includes a column assembly bearing block 232 with a cylindrical aperture 234 extending therethrough parallel to the Z axis and two guide channels 235 extending parallel to the X axis. A pair of guide shafts 236 are positioned in respective ones of the guide channels 235 with a pair of Y axis racks 240 extending between the guide shafts at respective ends. The column assembly 210 is supported by the bearing block 232, which in turn is coupled to the leg assembly 208 via the guide shafts 236. The ends of guide shafts 236 engage respective Y-axis bushings 250 that are positioned in slots formed in the leg assembly 208, permitting the guide shafts 236, with the bearing block 232 and column assembly 210, to translate in the Y axis. A Y-axis lock 252 is coupled to the leg assembly 208 and includes a rack engagement block 254 configured to engage the teeth of one of the Y-axis racks 240, in order to lock the guide shafts 236 in the Y axis. A pneumatic piston 256 is configured to disengage the Y-axis lock 252 when activated. The position assembly 212 also includes mechanism for locking the position of the column assembly in the X and Z axes and orientation. These mechanisms will be shown and described in more detail later.

The column assembly 210 comprises a Z-axis index 222, a Z-axis spacer 226, and a post sleeve support assembly 228, which is described in detail with reference to FIG. 7. The Z-axis index 222 has four vertical faces 229, each of which is provided with a pair of longitudinal slots 225 and an elevation scale 223 between the slots. Adjustable support saddles 227 slidably engage the longitudinal slots 225, and are configured to receive an end of the spacing beam 204, which will be described later. The Z-axis index 222 is rigidly coupled to one end of the Z-axis spacer 226, while the sleeve support assembly 228 is rigidly coupled to the other end of the Z-axis spacer. Thus, the distance and orientation of the post sleeve support assembly 228 remains fixed with respect to the Z-axis index 222. The Z-axis spacer 226 extends through the aperture 234 of the column assembly bearing block 232 so that a portion of the column assembly is above the bearing block and a portion is below. The Z-axis spacer 226 is translatable in the Z axis and rotatable around a longitudinal axis that lies parallel to the Z axis, within the aperture 234 of the column assembly bearing block 232. A Z-axis control 268 is provided (see FIG. 5) that locks the column assembly 210 in the Z-axis and in orientation, relative to the bearing block 232.

Figure 4:
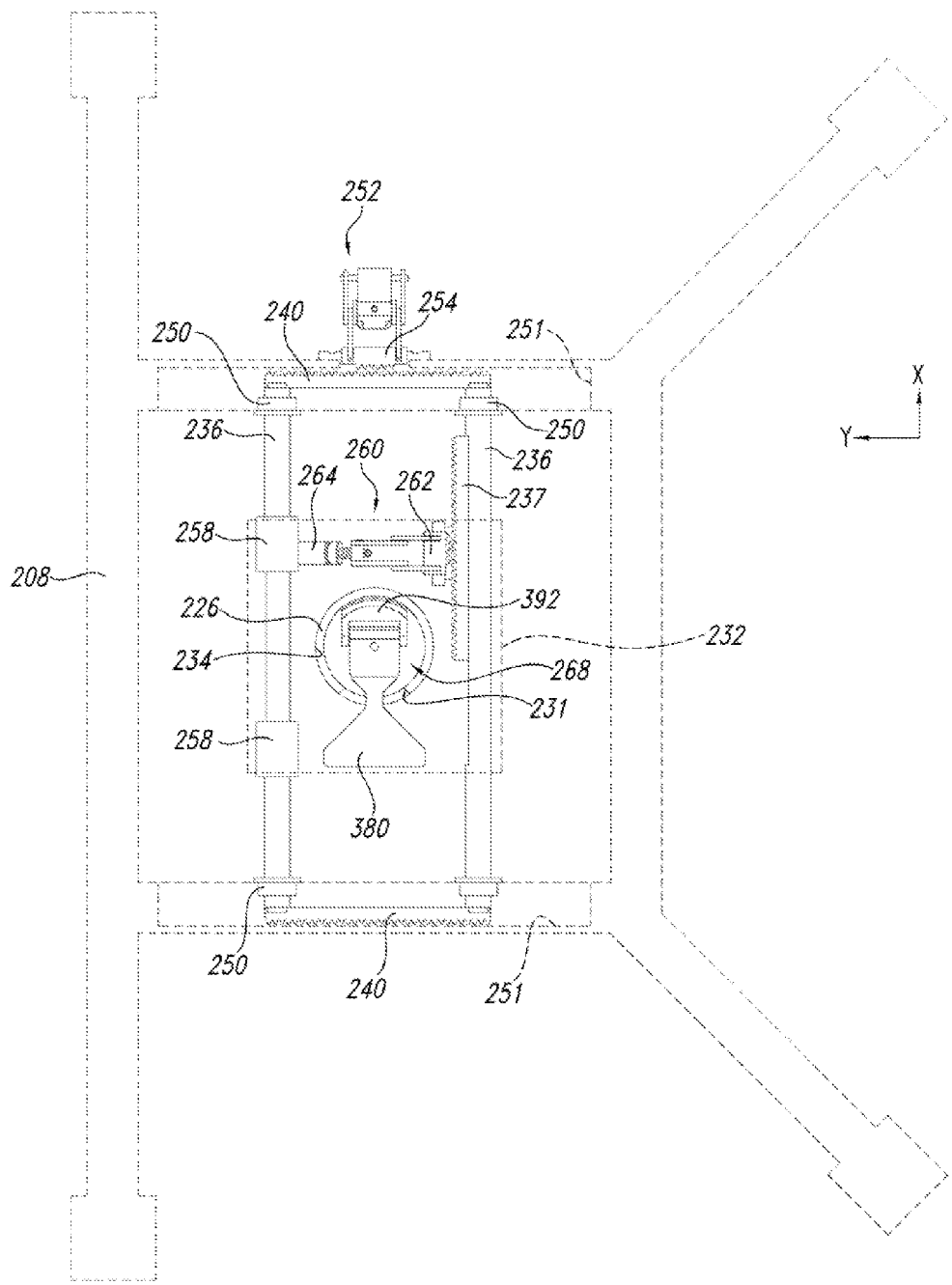
FIG. 4 shows a perspective view of elements of the post sleeve installation device of FIG. 3, showing additional details of the position control and lock mechanisms.
Figure 5:
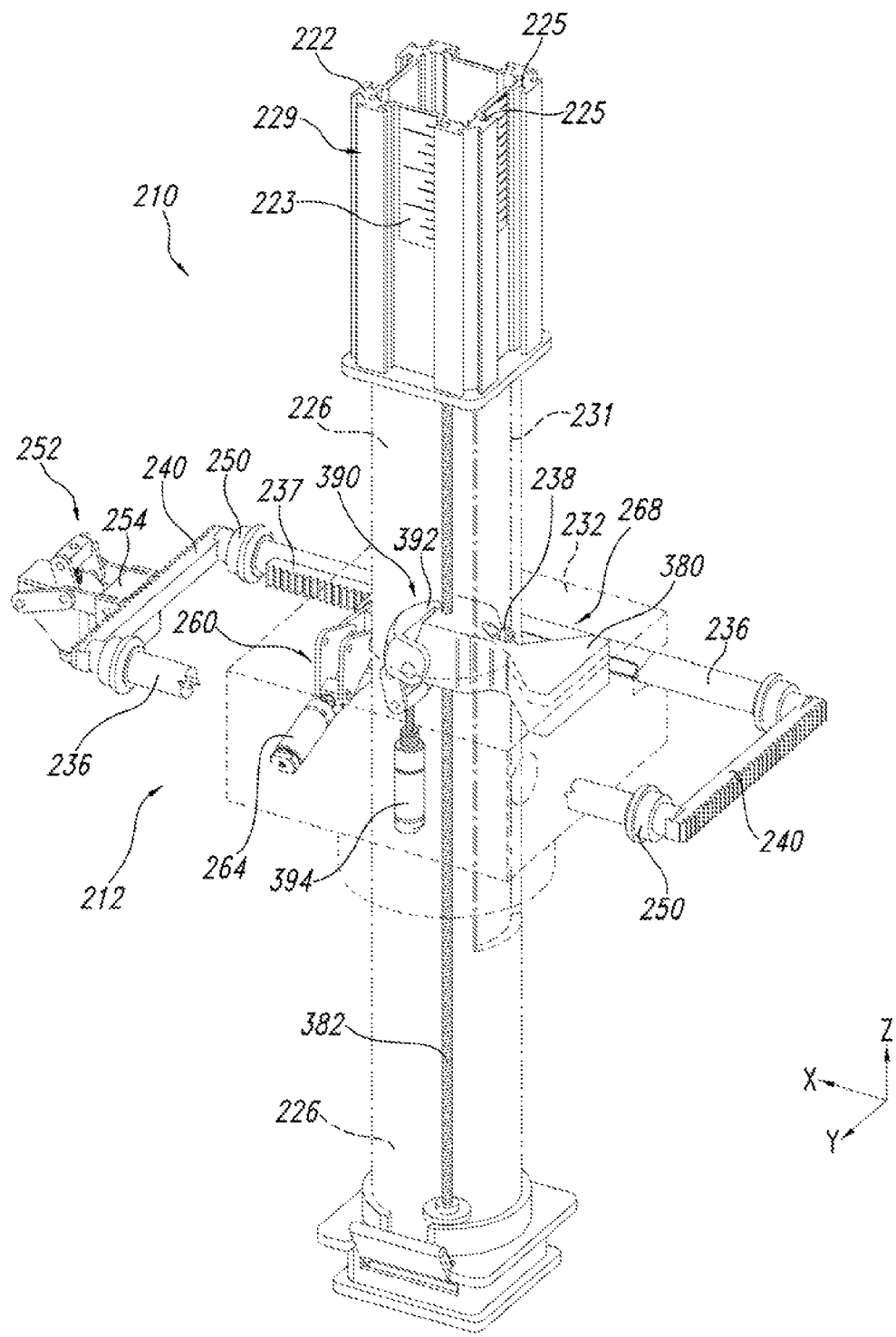
FIG. 5 shows an elevation view of z-axis and orientation control and lock mechanisms of a post sleeve installation device according to an alternative embodiment.

Turning to FIGS. 4 and 5, elements of the position assembly are described in more detail. FIG. 4 shows the position assembly 212 in plan view, with outlines of the leg assembly 208 and the column assembly bearing block 232 provided in dashed lines to show relative positions. Also shown are the locations of slots 251 in which the Y-axis bushings 250 are positioned to permit translation of the bearing block 232 and column assembly 210 in the Y axis. The spacer 226 is positioned in the cylindrical aperture 234, and includes a longitudinal aperture 231 through which a portion of the Z-axis control 268 extends.

The bearing block 232, with the column assembly 210, slides along the guide shafts 236 in the X axis. X-axis bushings 258 are provided in the guide apertures 235 to facilitate movement of the bearing block 232 along the guide shafts 236 without undue play. An X axis rack 237 is coupled to one of the guide shafts. An X-axis lock 260 is coupled to the bearing block 232 and comprises a rack engagement block 262 configured to engage the teeth of the X-axis rack 237, in order to lock the bearing block 232 in the Y axis. A pneumatic piston 264 is configured to disengage the X-axis lock 260 when activated.

FIG. 5 shows, in perspective view, the position assembly 212 and portions of the column assembly 210. The bearing block 232 and the spacer 226 are shown in dashed lines for reference. The Z-axis control 268 includes a Z-axis lift bracket 380, a lead screw 382, and a Z-axis drive. The Z-axis lift bracket 380 is coupled to the bearing block 232 and cantilevers into the longitudinal aperture 231 of the spacer 226, which extends for a substantial portion of the length of the spacer. The shape of the Z-axis lift bracket 380 and the width of the longitudinal aperture 231 cooperate to permit rotational adjustment of the column assembly 210 across a significant range. For example, in the embodiment pictured, the column assembly 210 can be rotated about 20-25 degrees in either direction from center. Provided the installer is able to orient the spider frame 202 to within about 20 degrees of the correct orientation, the column assembly 210 can be precisely adjusted to the desired orientation. The lead screw 382 is coupled to a plate at the bottom of the spacer 226 and extends axially within the spacer and through an aperture 386 in the Z-axis lift bracket 380. The Z-axis drive is mounted to the Z-axis lift bracket 380 and engages the lead screw 382. Although not shown in detail, the Z-axis drive operates in a manner similar to the worm drive 330 described with reference to FIG. 8. A drive input shaft 384 is provided for operation of the Z-axis drive, which, moves the column assembly in the Z axis, relative to the bearing block 232. The drive input shaft 384 is provided with a socket that is configured to receive a drive key, and can be operated using a common cordless drill.

An orientation lock 390 is coupled to the Z-axis lift bracket 380 inside the spacer 226, and includes a brake shoe 392, pivotably coupled to the lift bracket, and a pneumatic actuator 394 that is rigidly coupled to the lift bracket via an actuator mount that is not shown. A spring pulls the brake shoe 392 down into engagement with the inner surface of the spacer 226, effectively locking rotation of the column assembly 210. When the actuator 394 is activated, it pushes upward on the brake shoe 392 to disengage it from the spacer and permit rotational and Z-axis adjustment of the column assembly 210.

Figure 6:
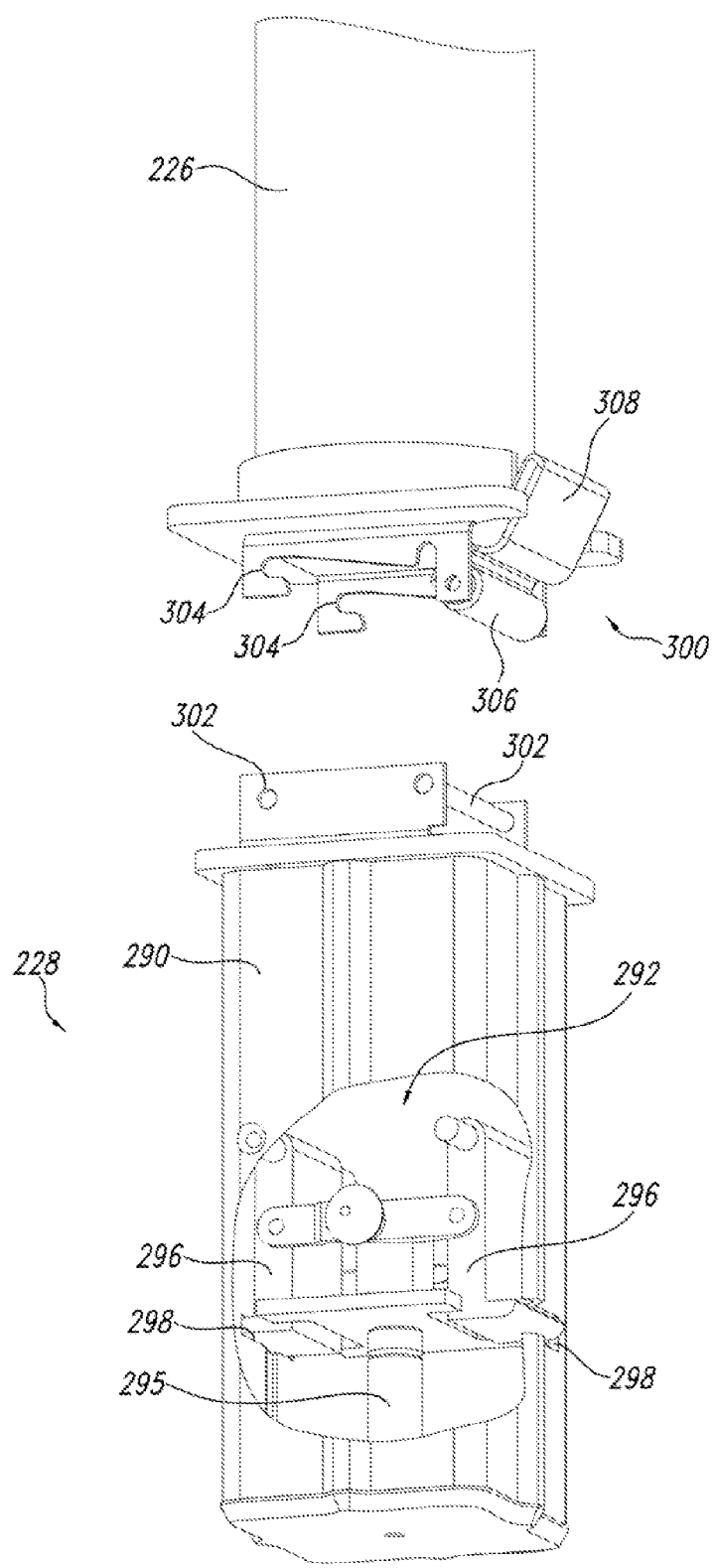
FIG. 6 shows a post sleeve attachment mechanism and quick release mechanism of the post sleeve installation device of FIG. 3.

FIG. 6 shows the lower end of the Z-axis spacer 226 and the post sleeve support assembly 228. The support assembly 228 includes an exterior casing 290, shown partially cut away to show details of a sleeve lift lock 292. The support assembly is also shown separated from the lower end of the spacer 226 to better illustrate a quick release mechanism 300, by which the support assembly can be easily coupled and decoupled with the spacer 226 allowing attachment of other devices such as bolt pattern plates or removable post hole molds. The lift lock 292 includes a pair of lift latches 296 configured to engage respective notches on inner surfaces of a post sleeve via slots 298 in the casing 290, in order to couple the sleeve to the support assembly 228. A pneumatic cylinder 295 is configured to withdraw the latches into the casing to release the post sleeve. A manual release 297 is also provided, comprising a section of braided wire coupled to the lift lock and extending to a pull-ring outside the upper end of the support assembly 228.

The quick release mechanism 300 is provided to couple the post sleeve support assembly 228 to the Z-axis spacer 226. The quick release mechanism 300 includes a pair of support bars 302 coupled to the upper portion of the post sleeve support assembly 228, and engagement notches 304, a spring latch 306, and a release handle 308 coupled to the lower end of the Z-axis spacer 226. To couple the post sleeve support assembly 228 to the Z-axis spacer 226, the user first positions one of the support bars 302 in the engagement notches 304, then applies upward force to the post sleeve support assembly until the spring latch 306 engages the other of the support bars 302. To release the support assembly 228, the user presses the release handle 308, which disengages the spring latch 306 from its support bar 302, permitting the other support bar to disengage from the engagement notches 304.

For operation of the various pneumatic devices described above, the spider frame 202 can be provided with an onboard source of pressurized air, as described later in an alternate embodiment, or can include a pneumatic connector configured to receive pressurized air from an external source, such as from a compressor, storage tank, etc.

In operation, a user first attaches a post sleeve to the spider frame 202. This can be done by engaging the post sleeve support assembly 228 in a post sleeve, then coupling the quick-release mechanism 300, with the spider frame standing on buckets or saw horses, or otherwise somewhat elevated to provide sufficient clearance. The user, preferably with a helper, then positions the spider frame 202 over a previously prepared post hole. The user adjusts the legs 214 until the spider frame 202 is level and stable, referring to the spirit vials 218 to find the level position. The user then releases the Y-axis lock 252 by applying air pressure to the pneumatic piston 256, and moves the column assembly 210 in the Y axis until it is correctly positioned, then releases the air pressure from the piston 256, which locks movement in the Y axis. The user then releases the X-axis lock 260 by applying air pressure to the pneumatic piston 264, and moves the column assembly 210 in the X axis until it is correctly positioned, then releases the air pressure from the piston 264, which locks movement in the X axis. Alternatively, the user can release both X- and Y-axis locks simultaneously and move the column assembly freely in both axes, then, when the assembly is properly position, engage both locks again.

Having positioned the post sleeve in the X and Y axes, the user then activates the pneumatic actuator 394 to free the rotation lock 390 and the Z-axis control 268. Operation of the Z-axis drive moves the column assembly, with the post sleeve attached, in the Z-axis, and orientation can be is simultaneously adjusted. When the actuator 394 is released, the brake shoe 392 again engages the spacer 226, rotationally locking the column assembly.

With the post sleeve correctly positioned, the user backfills the post hole with concrete around the post sleeve. When the concrete has set sufficiently to hold the post sleeve in position, the user releases the lift lock 292 to separate the post sleeve support assembly 228 from the sleeve, and raises the column assembly 210 until the post sleeve support assembly 228 is out of the sleeve. The user can then move the spider frame from its position over the post hole, and repeat the installation steps to install additional sleeves.

In alternate embodiments, the sleeve can be placed in the hole first, then the spider frame placed over the hole and the sleeve engaged while in the hole. In the event there is no "partner" to assist, this is a desired method, due to the weight concerns.

Figure 7:
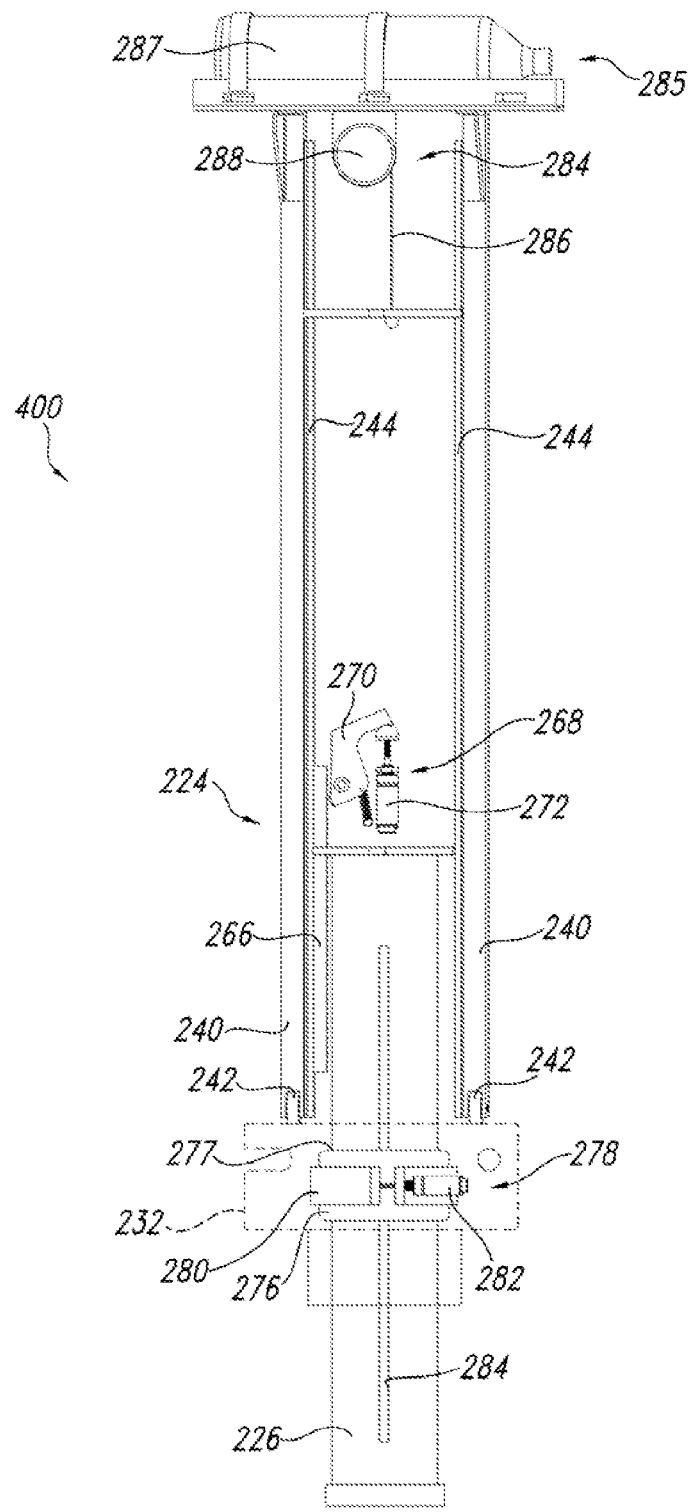
FIG. 7 shows a column assembly according to an alternative embodiment.

FIG. 7 shows a column assembly 400 according to an alternate embodiment, including a Z-axis position assembly 224 and a rotation lock 278. The column assembly 400 is shown with the outer portion of the Z-axis index removed to show details of the Z-axis position assembly 224. The Z-axis index includes a pair of guide tracks extending longitudinally along opposite corners, and in other respects is substantially identical to the Z-axis index 222 described above. The outline of the column assembly bearing block 232 is provided in dashed lines to show details and position. In addition to the Z-axis position assembly 224 and rotation lock 278, the column assembly 400 comprises a Z-axis tensioner 284, a pneumatic supply and control assembly 285, and the post sleeve support assembly 228.

The Z-axis position assembly 224 includes a pair of Z-position control legs 241 that each has a wheel 242 at a bottom end and a guide rail 244 that engages a respective one of the guide tracks of the Z-axis index. The engagement of the guide rails 244 with the guide tracks allows the Z-axis index to slide along the guide tracks in the Z axis. A Z-axis lock 268 is provided that locks the Z position control legs 241 relative to the Z-axis index. When the Z-axis lock is engaged, the Z position control legs 241, including the wheels 242 bearing on the upper surface of the column assembly bearing block 232, support and control the position of the column assembly in the Z axis, while permitting free rotation of the column assembly.

The Z-axis position assembly 224 comprises a Z-axis rack 266 coupled to one of the Z position control legs 241 and a Z-axis lock 268 coupled to the Z-axis index. The Z-axis lock 268 includes a rack engagement block 270 configured to engage the teeth of the Z-axis rack 266 in order to lock the column assembly 400 in the Z axis. A pneumatic piston 272 is configured to disengage the Z-axis lock 268 when activated.

The rotation lock 278 is coupled to the column assembly bearing block 232, and comprises a spacer sleeve 276 positioned in a cavity inside the bearing block 232, a locking band 280 that extends around the circumference of the spacer sleeve 276, and a pneumatic piston 282 configured to disengage the rotation lock 278 when activated. The spacer sleeve 276 includes an aperture 277 extending therethrough, aligned with and coaxial to the aperture 234 of the bearing block 232. A key is provided in the aperture of the spacer sleeve 276, extending parallel to the Z axis. A keyway 274 extends longitudinally in the Z-axis spacer 226, which is engaged by the key of the spacer sleeve 276. The key and keyway 274 are respectively sized to permit the key to slide easily in the keyway, so that the sleeve is rotationally fixed with the spacer, but the spacer is able to move parallel to the Z axis, with the key sliding in the keyway. The locking band 280 is normally biased toward a locked position, in which it tightly grips the spacer sleeve 276 to lock the spacer sleeve rotationally. The pneumatic piston 282 is configured to separate the ends of the locking band 280 when activated, which permits the spacer sleeve 276 to rotate with respect to the bearing block 232. Because the spacer sleeve 276 is rotationally fixed with respect to the Z-axis spacer 226 by means of the key and keyway 274, the locking band 280, when engaged, prevents rotation of the Z-axis spacer 226, together with the other components of the column assembly, while the column assembly remains free to move in the Z axis.

The pneumatic supply and control assembly 285 includes an air canister 287 to supply pressurized air for the various pneumatic pistons of the spider frame 202. The valves and plumbing of the air circuit are provided in accordance with conventional principles, which are well known in the art and so are not shown or described in detail.

The Z-axis tensioner 284 is coupled to an upper portion of the column assembly 400 and comprises a braided wire 286 coupled at one end to the Z-axis index, with the other end wound onto a spring loaded spool 288. The tensioner 284 applies a positive Z-axis bias to the Z-axis index to offset a portion of the weight of a post sleeve attached to the post sleeve support assembly 228 to assist the user in adjusting the Z-axis position. The spring tension of the tensioner 284 is adjustable so that it can be set to accommodate the weight of the post sleeve, which may be made from a number of materials, including light weight plastic and high density concrete, as described in more detail in previously referenced U.S. patent application Ser. No. 12/163,506.

In operation, with the leg assembly 208 positioned and leveled, the user releases the Z-axis lock 268 by applying air pressure to the pneumatic piston 272, and raises or lowers the Z-axis index, with the guide rails 244 of the Z position control legs 241 sliding in the guide tracks 238 of the Z-axis index so that the wheels 242 remain in contact with the upper surface of the bearing block 232. When the vertically mobile portion of the column assembly 400, which includes the Z-axis index, the Z-axis spacer 226, and the post sleeve support assembly 228, is correctly positioned, the user releases the air pressure from the piston 272, locking the column assembly in the Z axis. The user then releases the rotation lock 278 by applying air pressure to the pneumatic piston 282, and rotates the column assembly 400 around the Z axis. With the column assembly 400 locked in the Z axis, the wheels 242 of the Z-position control legs roll on the surface of the bearing block 232 to permit rotation of the column assembly while holding it fixed in the Z axis. When the column assembly 400 is correctly oriented, the user releases the air pressure from the piston 272 to rotationally lock the assembly. As mentioned above with respect to the X and Y axis positions, it is not essential that each position be established sequentially. A user can release all of the position locks, and move the column assembly rotationally and in all three axes simultaneously, to arrive at a desired position and orientation.

While various mechanisms have been disclosed as being actuated by pneumatic pistons that are configured to disengage their respective locking mechanisms or provide z axis control, according to alternative embodiments, other control and locking systems are provided. In one embodiment, manually operated locks are provided, such that the user engages and disengages the locks by rotating respective levers or latches. In another embodiment, a desired position is automatically or manually entered into a control circuit, sensors provided at various locations detect the position and orientation of the column assembly, and servomotors are controlled to reposition the column assembly to the desired position and orientation. According to an embodiment, the spider frame is self leveling. Sensors such as are well known in the art detect the degree of correction required to level the frame, and activate servomotors, pistons, or the like, to extend or retract the feet as necessary.

Figure 8:
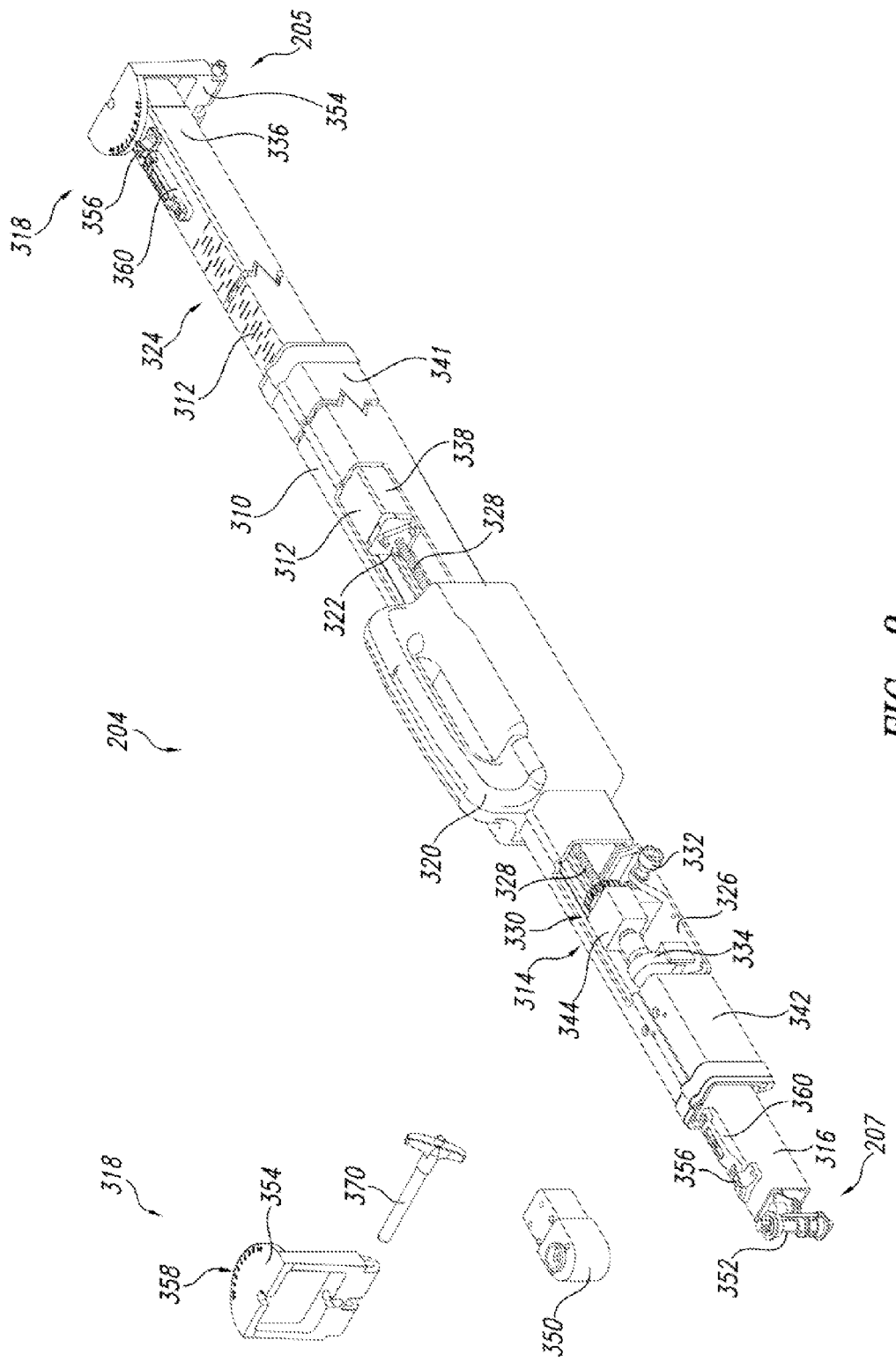
FIG. 8 shows the spacing beam of the post sleeve positioning system of FIG. 2.

Turning now to FIG. 8, the spacing beam 204 is shown according to an embodiment, with portions cut away to show internal detail. The spacing beam 204 includes a hollow casing 310, an extension arm 312, an extension mechanism, 314, a fixed arm 316, and first and second mounting fixtures 318. The hollow casing 310, the extension arm 312, and the fixed arm 316 are formed from materials that are selected to be substantially rigid and lightweight, such as, for example, aluminum extrusion, fiberglass, carbon fiber, structural foam, etc. The hollow casing 310 includes a handle section 320 that incorporates electronic control circuitry, the operation of which will be described later. The extension arm 312 is configured to slide telescopically within the hollow casing 310. The first mounting fixture 318 is coupled to a first end 336 of the extension arm 312, which also corresponds to the first end 205 of the spacing beam. A drive nut 322 coupled to a second end 338 of the extension arm 312, inside the casing 310. Scale markings 324 along the top of the extension arm 312 indicate, at the point where the extension arm enters a first end 341 the hollow casing 310, a total length of the spacing beam 204.

The extension mechanism 314 includes a mounting plate 326, a worm drive 330, and a threaded drive rod 328 coupled to the mounting plate via a bearing block 344, and having a worm gear of the worm drive fixed thereto. A drive input shaft 332 is coupled to a worm of the worm drive 330, which engages the worm gear for rotation of the drive rod 328. An encoder 334 is mounted on the mounting plate and coupled to an end of the drive rod 332 to detect and meter rotation of the drive rod relative to the casing 310. The mounting plate 326 is rigidly coupled to the casing 310, with the drive rod extending longitudinally within the casing and the drive input 332 extending from the casing via an aperture. The drive rod 328 engages the drive nut 322 of the extension arm 324 inside the casing 310 such that rotation of the drive rod extends or retracts the extension arm, according to the direction of rotation. The drive input shaft 332 is provided with a socket that is configured to receive a drive key, and can be operated using a common cordless drill. According to alternate embodiments, a servo motor is provided, configured to rotate the threaded drive rod 328, the drive nut 322, or the drive input 332 to extend and retract the extension arm 324.

The fixed arm 316 is rigidly coupled to the hollow casing 310 and extends a short distance from a second end 342 of the casing. The second mounting fixture 318 is coupled to the portion of the fixed arm 316 that extends from the casing 310, at the second end 307 of the spacing beam 204.

In the embodiment shown, the first and second mounting fixtures 318 are substantially identical, and one is shown partially exploded in FIG. 8. Each mounting fixture 318 includes a hinge knuckle 350 that is rigidly coupled to one of the fixed or extension arms 316, 312. The hinge knuckle 350 is rotatably coupled to a mounting bracket 354 by a coupling pin 352. An encoder is mounted in the hinge knuckle 350 and coupled to the coupling pin 352 to detect and meter rotation of the hinge knuckle 350 relative to the mounting bracket 354. The mounting brackets 354 also include a scale 358 indicating degrees of rotation, and an indexing pointer 356 is provided on the end of the respective arm 316, 312, positioned to indicate on the scale 358 the angle of the beam 204 relative to the mounting bracket 354. Spirit vials 360 are provided on the fixed and extension arms 316, 312 and configured to be centered when the beam 204 is in a level position. The mounting brackets 354 are configured to be coupled to an index face 229 of the column assembly 210 of the respective spider frame 202, as described in detail with reference to FIG. 9.

In embodiments that include electronic systems, a metering circuit is provided in the handle section 320, and coupled to the encoder 334 of the extension mechanism 314 and the encoders 362 of the first and second mounting fixtures 318, 319. The metering circuit is configured to determine, from the signal provided by the encoder 334 the position of the extension arm 324 relative to the casing 310, and thus the overall length of the spacing beam 204. From signals provided by the encoders 362, the metering circuit determines the angle of each of the mounting brackets 318, 319 relative to a longitudinal axis of the spacing beam 204. The electronic system can also include an electronic level with a digital readout indicating the angle of the beam, and can provide an audible signal when the beam is level, which relieves the installer of the necessity to refer to a spirit vial while adjusting the beam.

When the spacing beam 204 is level and coupled to extend between two spider frames 202, as shown in FIG. 2, the precise distance between the two spider frames is equal to the length of the beam, which is indicated by the scale 324 on the extension arm 312, the relative orientations of the column assemblies 210 of the respective spider frames is reflected by the angles of the mounting brackets 354 relative to the axis of the beam, and the difference in elevation is obtained by reference to the elevation scales 223 on the index faces 229 to which the respective mounting brackets 358 are coupled, as discussed below.

Figure 9:
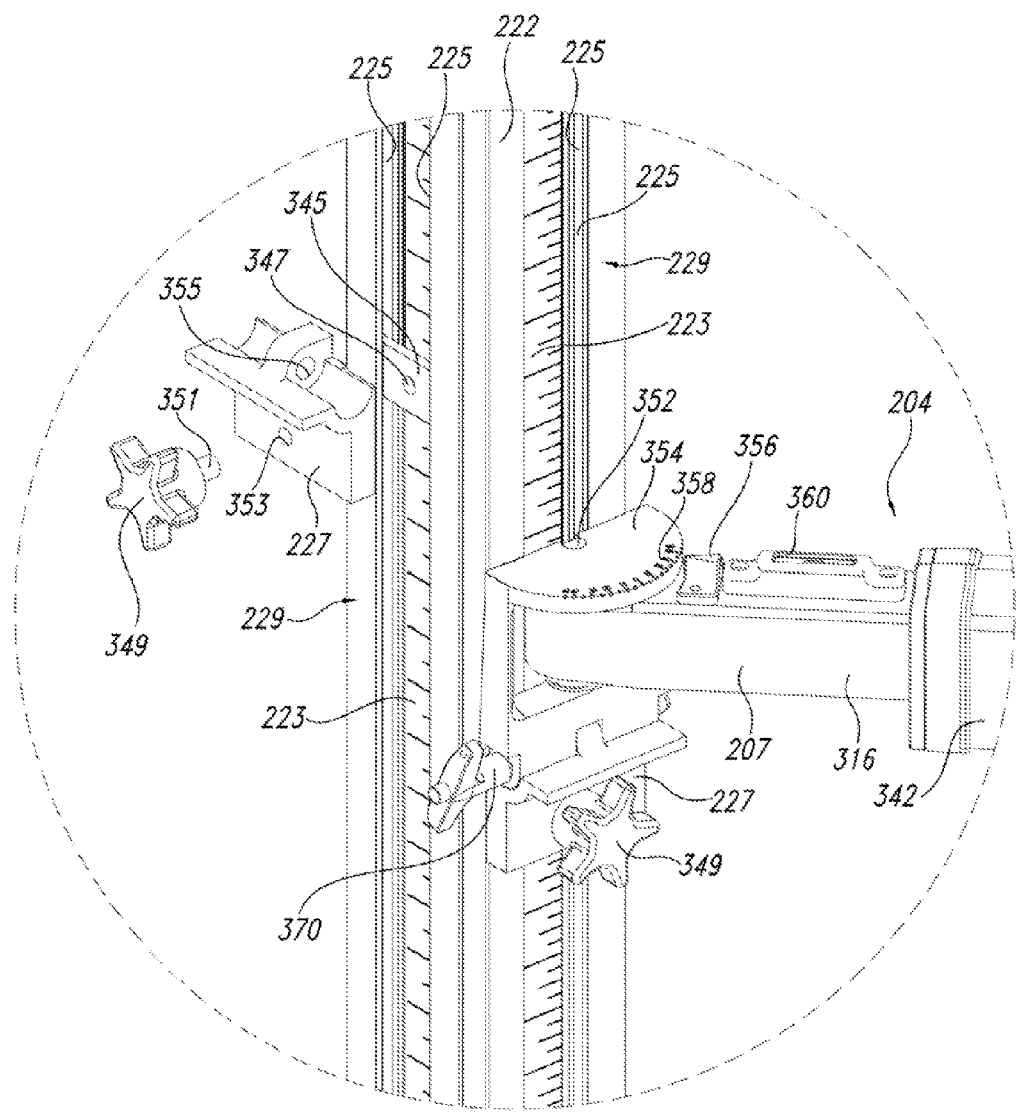
FIG. 9 shows a detailed view of a coupling mechanism of the spacing beam of FIG. 2, as indicated in FIG. 2 at 9.

Turning now to FIG. 9, a detail of FIG. 2 is shown, indicated in FIG. 2 by dashed circle 9. FIG. 9 shows the second end 207 of the spacing beam 204, including the fixed arm 316 and the second mounting fixture 318, with the mounting bracket 354 coupled to a saddle 227, which in turn is slidably engaged to the longitudinal slots 225 of one of the faces 229 of the Z-axis index 222. A second saddle 227 is shown in exploded view, coupled to an adjacent face 229. The saddle 227 includes a locking plate 345 that is captured between facing pairs of the longitudinal slots 225 so as to be slidable along the face of the index 222, but not removable. The locking plate 345 has a threaded aperture 347 that is engaged by a tensioning knob 349. The tensioning knob 349 includes a threaded connector 351 that traverses an aperture 353 in the saddle 227 and engages the threaded aperture 347 in the locking 347 plate 345. While the tensioning knob 349 is loose, the locking plate 345 can slide along the longitudinal slots 225, but when the user tightens the tensioning knob 349, the saddle 227 and locking plate 345 cooperate to lock the saddle in position.

A locking pin 370 of the mounting bracket 354 engages a transverse aperture 355 in the saddle 227 and corresponding apertures in the mounting bracket 354 to form a hinged coupling between the mounting bracket and the saddle, which permits one end of the spacing beam 204 to be coupled to a spider frame 202 as the user raises the other end until the spacing beam is level. The elevation of the mounting bracket 354 on the index 222 can be read from the scale 223 adjacent to the top surface of the mounting bracket.

It will be recognized that the value indicated on scale 223 has no relation to the elevation of the mounting bracket relative to the bearing block 232 or the leg assembly 208, or even, directly, to the ground on which the spider frame 202 is positioned. Instead, the value is directly related to the distance of the mounting bracket from the post sleeve coupled to the column assembly 210. Thus, the difference in values indicated at the first and second mounting brackets 354 of the spacing beam 204, coupled to respective spider frames 202, represents the difference in elevation between the respective post sleeves. If the mounting bracket 324 that is coupled to the higher of the two spider frames is aligned with the zero position at the bottom of the corresponding scale 223, the value indicated at the opposite mounting bracket will be the actual difference in elevation between the post sleeves. Otherwise, it is a simple matter of subtraction to obtain the correct value.

According to an embodiment, the hinge knuckle 350 of the mounting fixture 318 is provided with an additional encoder that is configured to read the scale 223 of the Z-axis index 222 and provide a signal corresponding to the vertical position of the mounting bracket 319 on the index, and the metering circuit is configured to derive a relative elevation difference of the post sleeves on the basis of signals from encoders at the first and second ends 205, 207 of the spacing beam, to establish the relative elevation difference.

According to another embodiment, laser distance finders are coupled to the ends of the spacing beam 204 in proximity to the coupling pin 352, and configured to provide a signal corresponding to a distance from the mounting bracket to a plate at the base of the Z-axis index, from which the elevation difference can be derived.

Installation of a number of post sleeves, for a fence run, for example, will now be described with reference to FIG. 2. To differentiate between the elements of the spider frames 202a and 202b in the description, references to elements of the spider frame 202a will include the character "a," while references to elements of the spider frame 202b will include the character "b."

The basic layout of the fence is first established. This generally involves determining the location of the main posts, and the appropriate spacing between the line posts. A fence line is then established. This is traditionally done by running a string line parallel to the fence line some short specific distance away, which permits the installer to build the fence without interfering with the line, but having the line available for reference. It is becoming more common for a contractor to use a laser plane projector, such as are used in many of the construction trades, to project a vertical plane along the fence line. The installer starts at the far end and works toward the projector, using the vertical line projected by the device to align the fence.

To install a number of post sleeves, an installer user first provides post holes at the general locations where the post sleeves are to be installed. A first post sleeve 206 is positioned in the X, Y, and Z axes using a first spider frame 202a, substantially as described above. The spider frame 202a is locked in orientation and all axes, oriented and aligned with the centerline of the fence line. The footing of the first post sleeve is then poured.

A second spider frame 202b is positioned over the adjacent post hole with a second post sleeve attached. The second spider frame 202b is leveled and the second post sleeve is correctly positioned in the Z axis. The second spider frame 202b is locked in the z axis only, being otherwise free to move and rotate. Evaluating the two post sleeves, the installer determines which is at a higher elevation, which, in FIG. 2, is the sleeve of spider frame 202b. Using support saddles 227 on the most nearly mutually facing faces 229 of the Z-axis indexes 222a and 222b, the installer sets the higher sleeve's saddle 229b to the zero position, and sets the opposing saddle 229a to approximately or exactly the same elevation. This can be done with a laser level or vial level, etc. The spacing beam 204 is then set to the desired length, and its first end 205 is coupled to the saddle 227a of the first spider frame 202a. With the X and Y axes and rotation of the second spider frame 202b unlocked, the second spider frame 202b is manipulated until the second end of the spacing beam can be coupled to the saddle 227b. The level of the beam 204 is adjusted, if necessary, by moving the mounting bracket of the lower (202a) of the spider frames until the beam is perfectly level.

The second spider frame 202b is then brought into proper alignment with, and centered on the fence line, with the column assembly 210b floating in the X and Y axes and rotation, to permit alignment and any final adjustments of the beam length. With the spacing beam 204 set and level, and the column assembly 210b correctly positioned in the X and Y axes and in orientation, the installer engages the respective locks, then pours the footing of the second post sleeve.

If the post sleeves are being installed to a prepared plan that sets forth specific values, the values will have been confirmed before and after the footing is poured, and are thus known. If the sleeves are being installed according to a more general plan, in which, for example, the distances between fence posts have been substantially predetermined, but other parameters are to be established on site, data from the spider frames and spacing beam is collected immediately after the footing is poured, including distance, relative orientation, and relative elevation.

One of the advantages provided by many of the disclosed embodiments is that post sleeves can be installed according to very precise position and orientation requirements. This is necessary when using fence panels that are manufactured before the sleeves are installed, because the size and shape of the panels are already fixed. However, another advantage is that, where the fence panels will be manufactured after sleeve installation, sleeves can be installed with a certain degree of latitude, because, however inexact the installation may be, the exact values of the relative positions and orientations of the sleeves are obtained once the sleeves are emplaced. This permits an installer to work much more quickly than would be possible when installing to very precise values, while still being able to obtain accurate values for the manufacturer of the panels.

Each post sleeve is provided with a unique identifier (UI). This can be a factory-installed serial number, a reference marking placed on the post sleeve or on the footing as the sleeve is installed, some reference marking on a plat map, GPS coordinates, etc. In any case, these identifiers are recorded with the collected data so that the correct fence panel can be manufactured and installed.

Once the data has been collected, the user decouples the spacing beam 204 from the first and second spider frames and repeats the process by positioning a third post sleeve coupled to a third spider frame in a hole prepared adjacent to the second post sleeve, with the second spider frame now fixed in position and the third spider frame being adjusted accordingly.

An installer may work with as few as three or four spider frames, while all but the shortest fences will have many more posts to be installed. Accordingly, once the available spider frames have been used, the user tests the oldest of the footings for firmness of the concrete, and when safe, moves that spider frame to the newest hole. Depending on how fast the concrete sets and how fast the installer works, it may be necessary to use three to six spider frames to efficiently install any number of post sleeves, leapfrogging each from the back of the line to the front as the concrete in each hole sets.

As each post sleeve is positioned, data necessary to manufacture a fence panel for that location is collected from the spacer beam 204, including the exact distance between the post sleeves, the relative orientation of the post sleeves, and the relative elevation of the post sleeves.

The data can be collected in a number of different ways. For example, the installer can merely read the values from the spacing beam 204 and Z-axis index, and write them down or enter them into a recording device. Alternatively, the spacing beam 204 can be provided with a metering device that includes a transmitter, configured to transmit the relevant data to a receiver that saves the data for each panel. Post identification data can also be collected automatically or manually. According to various embodiments, each post sleeve is provided with a unique bar code identifier or RFID tag that the user scans to enter.

The user sends the data for the fence to a central data repository and/or a manufacturer, who then manufactures all of the panels, marks each panel with the appropriate information to identify the post sleeves supporting the posts between which it will be attached, and ships the panels back to the user. The manufacturer may also cut posts to the correct lengths and ship those, as well. The user then correlates the markings on the posts and panels to the UI of the post sleeves, and then places the fence posts in the corresponding post sleeves and installs each fence panel between the designated pair of posts.

According to an embodiment, as the data is collected, it is immediately uploaded to the repository or manufacturer via a cellular or web connection, allowing production of the panels to begin as the sleeves are being installed.

According to another embodiment, the positions and spacing of the fence posts are determined in advance, and the fence panels are preordered. In this case, the user installs the post sleeves from a specific plan, and positions the posts precisely as required to receive the panels. In such a case, it becomes necessary to perform at least a basic survey of the property to establish overall dimensions and elevations. In a similar way, a user can install mass-produced fence panels at their standard spacing.

Figure 10:
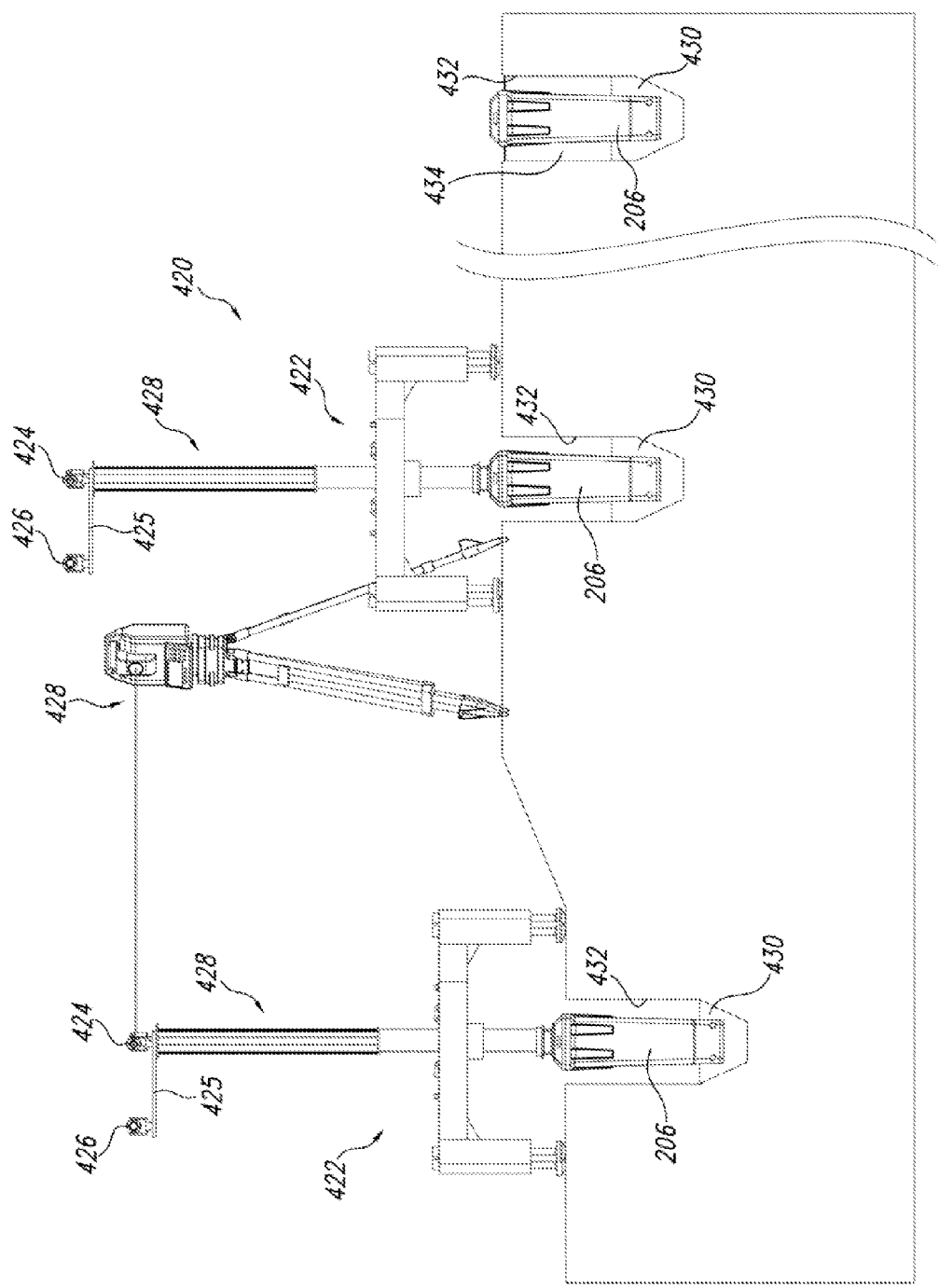
FIG. 10 shows a post sleeve positioning system according to another embodiment.
Figure 11:
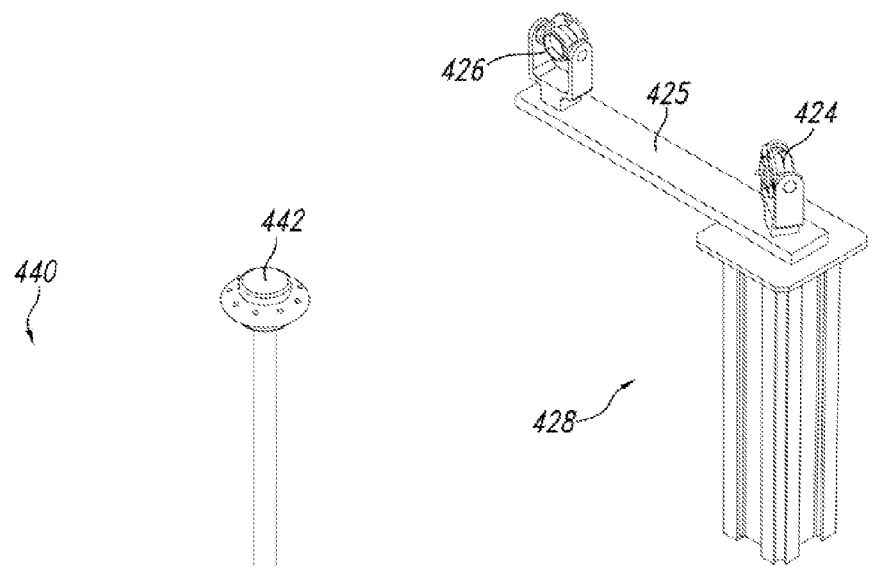
FIG. 11 shows a detail of the system of FIG. 10.

FIG. 10 shows a post sleeve installation system 420 according to another embodiment. Spider frames 422 are provided, that in most respects are similar to the spider frames 202 described previously, and are configured to permit adjustment of the position and orientation of a post sleeve as previously described. However, the spider frame 422 includes a first prism 424 coupled at the top of its column assembly 428 and axially aligned therewith. Accordingly, when the spider frame 422 is correctly leveled, the first prism 424 is centered directly above the post sleeve 206. A second prism 426 is coupled to the column assembly 428 at the end of a cantilevered arm 425 having a known length. A more detailed view of the top of the column assembly 448 is shown in FIG. 11. The first and second prisms 424, 426 are configured to reflect a light beam back along a reciprocal vector. Thus, when a light, such as a laser, is projected at one of the prisms, it will be reflected directly back to the source.

A surveyor device 428 is provided, which is configured to detect the positions of the prisms 424, 426, and is capable of accurately determining the angle and distance of each prism relative to the position of the surveyor device. Devices employing such technology include the "total station," which is used in many industries for surveying, rangefinding, and other tasks related to determining spatial relationships of different elements. Total stations are produced by a number of manufacturers, including, for example, Topcon South Asia PTE LTD.

According to an embodiment, the surveyor device 428 is positioned in a central location relative to a fence line to be installed. As the spider frames are positioned at each post sleeve location, the surveyor derives the position of the sleeve from the position of the first prism 424, and the orientation from the position of the second prism relative to the first. Given the exact positions and orientations of two post sleeves relative to the position of the surveyor device 428, the device is programmed to calculate their positions and orientations relative to each other, and to store or transmit that data. Where the installer is working according to a pre-established plan, the parameters are programmed into the surveyor 428, which is configured to provide visual or audible signals to aid the installer in correctly and precisely positioning each post sleeve 206.

Also illustrated in FIG. 10 is an installation method according to one embodiment. Each hole 432 is only partially backfilled initially, using a fast-setting concrete, expansion foam, or other formulation 430 so that the spider frames can be moved more quickly. The user later returns and finishes backfilling the holes with a concrete formulation 434 that is selected for strength and weatherability. The first partial footing 430 is configured to set very quickly, with sufficient strength to hold the post sleeve 206, to permit the installer to work more quickly using fewer spider frames.

Additionally, the material of the partial footing can be configured to have a selected porosity, to permit water that enters the sleeve to percolate from the sleeve into the ground at a controlled rate.

Figure 12:
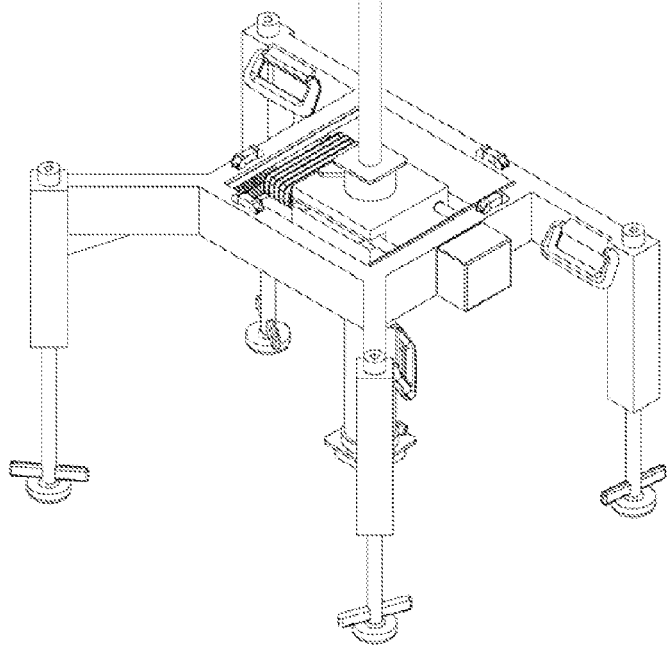
FIGS. 12 and 13 each show a post sleeve installation device according to a respective embodiment.

FIG. 12 shows a spider frame 440 according to another embodiment. The spider frame 440 is provided with a GPS receiver 442 that is configured to collect position and orientation data from satellite transmissions. The data is collected by a collection device configured to derive and store the values necessary to produce required fence panels.

Figure 13:
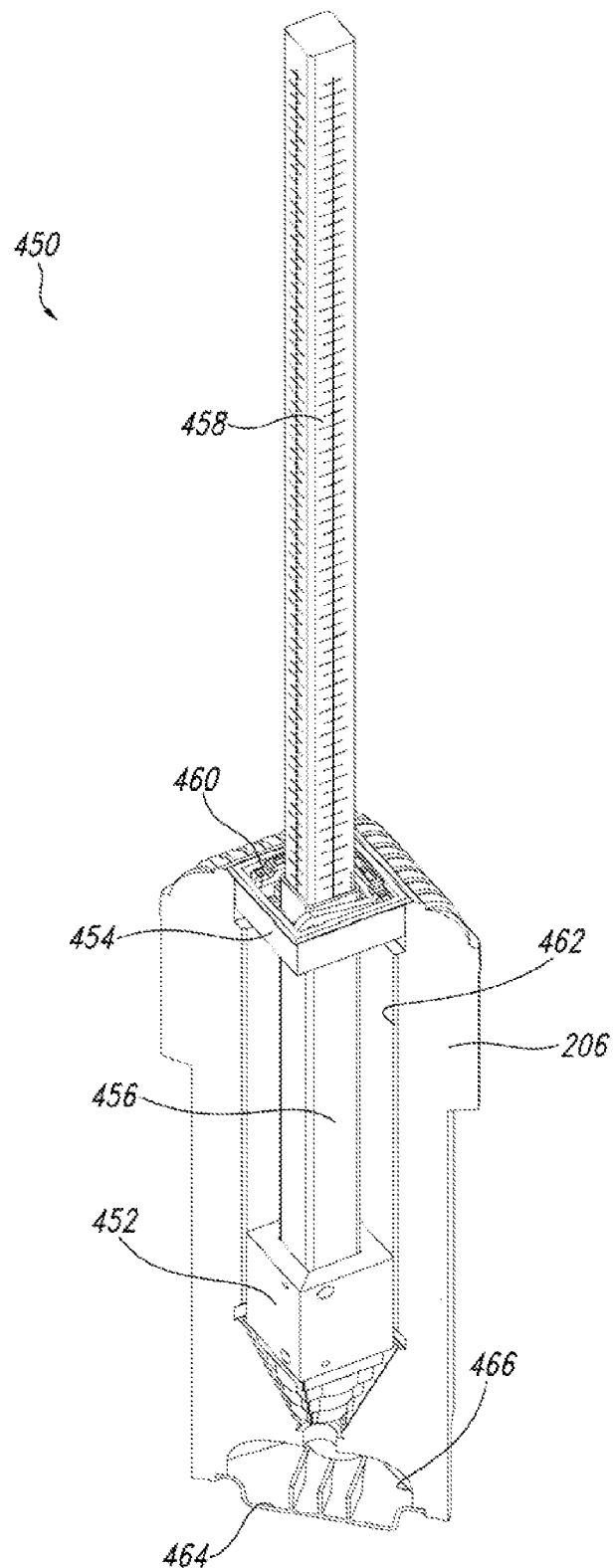

Post positioning systems have been disclosed, according to various embodiments, that employ spider frames with adjustable legs for positioning post sleeves. However, the scope of the invention is not limited to such structures. For example, according to an embodiment, a motorized system is provided that is self propelling, using wheels, or tracks similar to those of a bulldozer, and that includes a post sleeve attachment, as well as systems for manually or automatically positioning, orienting, and plumbing a post sleeve. The system can be configured to be operated by direct or remote control of an operator, or to be preprogrammed so as to move automatically from one position to the next, guided by GPS, or by reference to a fixed position, such as a transmitter or a surveyor device, or by other known systems or methods. FIG. 13 shows, according to another embodiment, a cutaway view of a post sleeve 206 with a post sleeve positioning device 450 positioned in the cavity 462 of the post sleeve. The device 450 includes a weight 452, a lower column 456, a telescoping index 458, and an adaptor cap 454. Bubble vials 460 are provided, coupled to the adaptor cap 454. The weight 452 is sized to fit into the cavity of the post sleeve and rest on the bottom, and the adaptor cap 454 is sized to fit snugly into the opening and hold the index 458 in alignment with the cavity.

It will be recognized that, because of cavities within the post sleeve, including the main cavity 462, the sleeve will float in freshly poured concrete. The weight provides sufficient ballast to allow the sleeve to maintain a vertical position in the wet concrete without external support. The installer pours the concrete into an empty post hole, then immediately lowers the sleeve 206 and positioning device into the slurry. Using the bubble vials, the installer plumbs the post sleeve 206 by simply grasping the index 458 and moving it until the bubbles are centered in both axes. After installing a second post sleeve, the installer uses a tape measure to measure the distance, on a horizontal line, from one sleeve or index to the next. Using a hand-held laser level, positioned on the top of the post sleeve 206 or index 458, the installer marks the position of one post sleeve on the index of an adjoining sleeve to determine the relative elevation.

If the sleeve 206 needs to be deeper in the footing, the installer adds weight to the ballast so the sleeve will settle. For example, the installer can simply pour water into the sleeve until it settles to the desired depth. In the sleeve 206 that is pictured in FIG. 13, a temporary degradable seal 464 is provided to form a percolation chamber 466 at the bottom of the sleeve, to eventually permit water to percolate into a porous footing. The seal 464 is made from a material configured to disintegrate and, preferably, dissolve in water, but even with water in the chamber the seal will last long enough for the footing to set.

Using a laser plane projector to establish a vertical plane along a fence line, the index 458 of the positioning device 450 can be aligned with the projected vertical line. By starting at the farthest hole and working toward the projector, the index of one post sleeve will not interfere with the reference plane while installing the next post sleeve. Provided the total change in elevation of the fence line does not exceed the capacity of the index 458, a horizontal plane can also be projected from the highest point along the fence line, to establish changes in elevation relative to the projector. The installer notes the height at which the index 458 intersects the plane, and by subtracting the value noted on an adjoining index, determines the relative elevation of the respective post sleeves. In the event the total change is in excess of the capacity of the index 458, a more localized reading, from one sleeve to the next, can be obtained by using a laser level, as described above.

According to an embodiment, a battery-powered vibrator is attached to or encased by the weight 452 to remove unwanted air from the concrete footing and assist in self plumbing.

According to another embodiment, a compass is provided, coupled to the index 458 or adaptor cap 460 to assist the installer in properly orienting the post sleeve.

According to another embodiment, a bullseye level is coupled to the top-most surface of the index 458 to provide a convenient reference while a user plumbs the post sleeve.

It will be recognized that the post sleeve positioning device 450 is not ideally suited to position post sleeves as precisely as are the spider frames disclosed above. However, it is envisioned that such a device will be useful to consumers who prefer to do much of the work themselves, and do not have a need sufficient to justify the greater cost of buying or renting a number of spider frames to install a relatively small number of post sleeves.

According to another embodiment, a post sleeve positioning device comprises a tripod, configured to be positioned over a post hole and to support a post sleeve hanging thereunder. By changing the length of one or two of the legs, the position of the post sleeve can be adjusted in the X and Y axes, and the elevation of the post sleeve can be adjusted by making equal changes to all of the legs. Other structures for controlling position and orientation of a post sleeve coupled to the tripod are also within the abilities of one of ordinary skill in the art.

Figure 14:
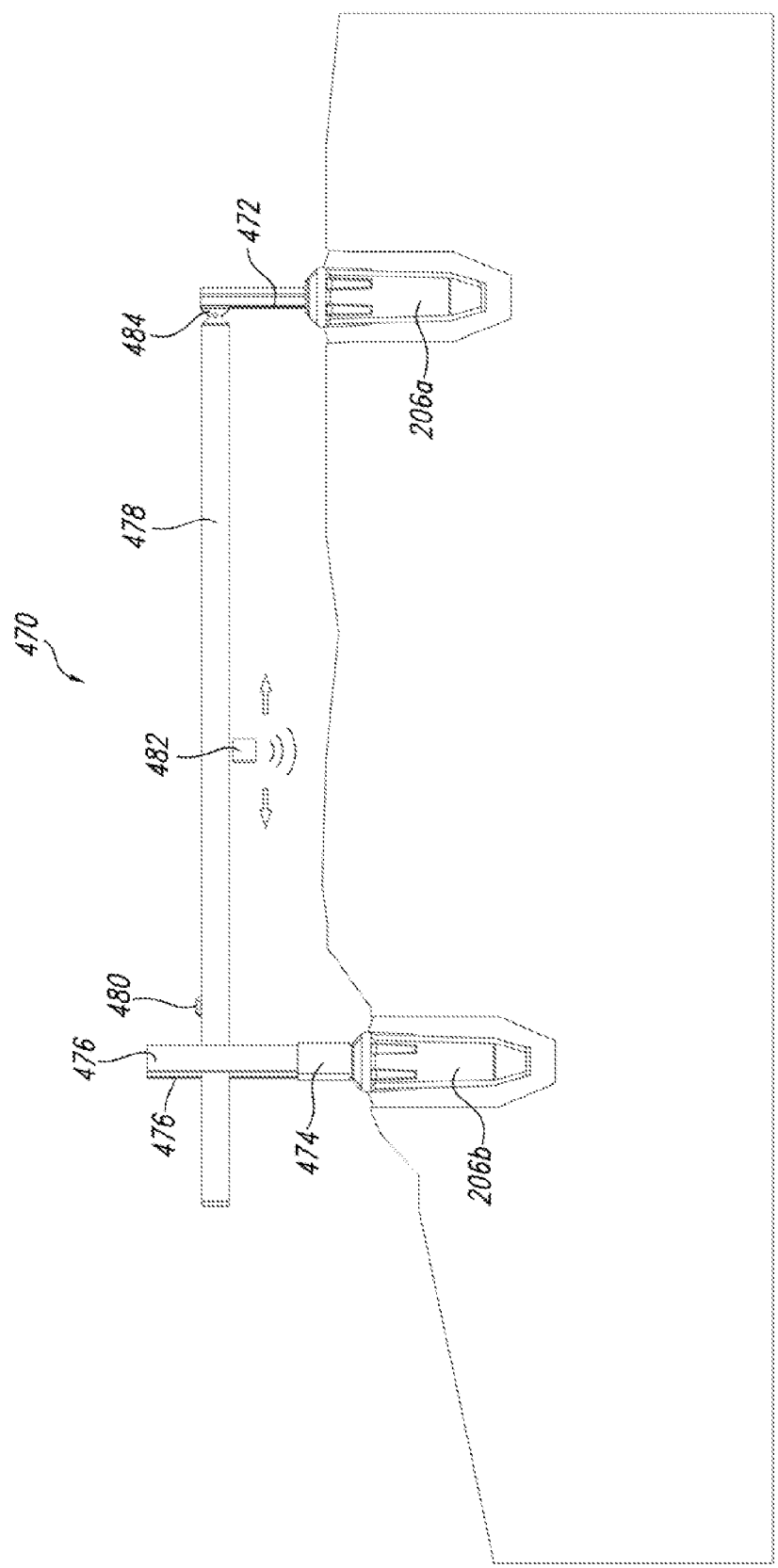
FIG. 14 shows a ground scanner system according to one embodiment.

FIG. 14 shows a ground scanner system 470 according to one embodiment. The system 470 includes a support post 472 that is rotatably coupled to a sleeve insert positioned in a first post sleeve 206a. A reference post 474 is rotatably coupled to a sleeve insert positioned in a second post sleeve 206b, and includes spaced-apart arms 476 extending vertically from the reference post. A cross beam 478 is pivotably coupled to the support beam 472 by a bracket 484, and extends horizontally toward the second post sleeve 206b, to be received between the spaced-apart arms 476.

The user adjusts the height of the cross beam 478 where it passes between the arms 476 until the cross beam is level, as indicated by a bubble vial 480 attached to the cross beam or by some other known method. A ground scanner 482 is moved along a track extending along the bottom of the cross beam 478. As it is moved, using known rangefinding technology, the ground scanner 482 maps the surface of the ground directly beneath the cross beam 478, along the line that a fence panel will eventually occupy. With this data, the manufacturer can fabricate a fence panel with a bottom edge that exactly follows the contour of the ground between the post sleeves 206a and 206b, including any obstructions, such as boulders, curbs, etc.

The position of the bracket 484 on the support post 472 can be adjusted vertically, to accommodate obstacles or extreme differences in elevation. The support post 472 and the reference post 474 can be rotated around their Z axes, relative to their respective sleeve inserts, so that they can accommodate post sleeves that are not rotationally aligned with each other.

According to an embodiment, the various elements of the ground scanner system 470 are provided with the necessary graduated scales or sensors to obtain relative distance, elevation, and orientation data with respect to the placement of post sleeves 206a and 206b. Such scales or sensors are within the abilities of one of ordinary skill, especially in view of the other embodiments disclosed herein. For example, the cross beam 478 can be provided with distance markings along its length, and a reference point on one or both of the arms 476 of the reference post 474, and from which the precise distance between the sleeves can be obtained. Likewise, scales can be provided that display the angles of the support post 472 and the reference post 474 relative to their respective sleeve inserts, and the height of the cross beam 478 above each sleeve. Of course, the system can also be configured to obtain the same information more or less automatically, using electronic sensors, transmitters, receivers, etc.

A method is provided, according to an embodiment, by which an installer first prepares post holes and installs post sleeves, correctly positioned to within a substantial tolerance. This can be done, for example, using GPS technology, by floating the sleeves, as described with reference to FIG. 13, or by more conventional methods. The installer (or another individual) then moves along the line of post sleeves and collects the data necessary to manufacture the posts and panels, using, for example, a system similar to that described with reference to FIG. 14. This can be done immediately after the sleeves are installed, or any time thereafter.

Various devices and methods have been described for obtaining data regarding the relative positions of post sleeves, including elevation, orientation, and distance. It should be noted that in some cases, the only information necessary is distance and elevation, or even distance, alone. For example, if a fence is to include only straight lines and right angles, and the posts are to be square and aligned with the fence line, every fence panel will be perpendicular to the faces of the posts to which it is attached. Thus, orientation of each post need not be measured. This is also true if the posts are to be round, regardless of the path followed by the fence line. Likewise, if the fence is to follow a substantially level line, elevation need not be measured.

Thus, while various embodiments enable the collection and transmission of many classes of data, the scope of the claims also encompasses embodiments in which only limited data is collected or transmitted.

Many of the disclosed embodiments can be adapted for use with other post support mechanisms, such as, for example, post brackets, which are sometimes used to attach posts to existing surfaces. Furthermore, even in cases where posts are set in the ground by conventional means, without sleeves, custom fence panels can be manufactured as disclosed, if the necessary data is collected and transmitted to the manufacturer.

According to various embodiments, as discussed above, data related to the positioning of the post sleeves of a fence are collected for use by a fabricator to make fence panels or kits in a factory environment that are "custom made" for that fence. According to another embodiment, a central data archive is provided, to which the data is also sent. By collecting and storing such information, it is preserved for access at any time in the future. For example, if a portion of a fence is damaged, the information is available to produce replacement panels with the same style, material, and finish as the original fence, even if the fence is a one-of-a-kind design. Any properly equipped fabricator can use the previously stored data to manufacture replacement panels that will perfectly match the original design. Furthermore, when a fence is to be completely replaced, it is not necessary to obtain new data unless the location of the fence also changes. Otherwise, new posts can be placed in the original post sleeves, meaning that the original data will still be valid.

Ideally, the central archive collects data from a very large geographical region, e.g., nationally. However, a number of different facilities can collect the information for respective smaller geographical areas, as well, such as by state or county. Archives can be maintained by any of a number of different entities, including, for example, local or national trade groups, for-profit companies, local governments or extension services, fabricators themselves, etc.

Nevertheless, there are some benefits that are obtained from centralized collection of the information. For example, statistical data can be obtained for evaluation of performance and durability of different post sleeve designs, materials, and installation methods, over extended periods, in many different environments. Also, with many archives, it may be at times difficult to locate data for a given fence. Controlling entities can move or go out of business or consolidate; competing manufacturers could be reluctant to share data, etc. In contrast, if there is one central archive, there is never a problem locating the data, and it is more likely to remain current.

According to one embodiment, a fence installation process is provided. Initially, a piece of property is surveyed and the property lines are defined. This can be in conjunction with the subdivision of a larger parcel, or by a developer who surveys all the lots of a housing development, etc. The locations of post sleeves are then determined. According to one embodiment, a software program is provided that is configured to automatically select the positions and spacing of the post sleeves on the basis of the plot plan or survey data, and preferences entered by a user. For example, the user can define the maximum distance between posts or the maximum length of fence rails, and can select the locations of gates, runs, etc., which are shown on a site map that can be printed out for use by the installer. If the post sleeve installation system is configured to employ a post-to-post spacing format, like that described with reference to FIGS. 2-8, the locations of the fence and main posts are marked on the property by referring to the site map. The markings are general in nature, e.g., a string line, laser line, stakes, GPS etc., to assist in initial positioning of the post holes and main post sleeves. The post holes are then dug and the sleeves are installed. Although the installer works from the site map and spacing previously set forth, the actual position and orientation of each post sleeve, relative to the adjacent sleeves, is determined and recorded by the installer. This ensures that small deviations from the prescribed positioning are recorded, so the fence panels will fit properly.

If the installation system is configured to employ a primary reference point, e.g., the prism system described with reference to FIGS. 10 and 11, then the reference point where the surveyor device is positioned is selected when the sleeve positions are determined and marked on the property. The installer then digs the post holes and installs the sleeves, positioned with reference to the locator unit as described above.

If the installation system is configured to employ a GPS positioning system, such as that described with reference to FIG. 11, the precise coordinates of each post are determined and shown on the site map, and the installer works from the site map to dig the holes and install the post sleeves, which obviates the need to mark the property.

Alternatively, an installer merely marks the location of the fence and main posts of a fence run using existing landmarks as references, then calculates an appropriate equal spacing for the remaining posts of the run.

Regardless of the system employed to position and install the sleeves, in each case, the positions of each sleeve, relative to the adjacent sleeves, is obtained and recorded, because this is what the fabricator will need to produce the fence panels.

The post sleeves may be installed before other construction is begun, and perhaps even before the property is fully graded. The installer positions the post sleeves at the finish elevation, even if the ground where the post sleeves are installed is not yet at the finish grade level. In such a case, the contractor may thereafter use the pre-positioned post sleeves as markers when finish grading the property. This means that particular sleeves may be installed some distance above or below the current grade. To install below grade, of course, the installer merely digs a deeper post hole and places the sleeve at the correct level. To install more than a few inches above grade, the installer can use a commercially available concrete form (e.g., a Sonotube® form) to make a short column in which the sleeve is embedded. The sleeves can be capped to prevent dirt from falling inside, or marker flags can be placed in the sleeves so the graders can see them, for reference, and to avoid damaging them. The sleeves are positioned so that, when the property is at the finish grade, the sleeves (capped) are a few inches below the surface, and may even be covered with sod.

During installation of the post sleeves, information necessary for manufacture of the panels is collected, either automatically or manually, depending on the installation system used. This information is sent to a central archive, where it is assigned a file number and stored. The information provided by the post sleeve installer includes the locations of all of the post sleeves on the property, their relative positions and orientations, and the UI of each sleeve. Additional information that can be provided includes, for example, the sleeve model and manufacturer, the grade of concrete used to install the sleeve, provisions made for drainage, depth of concrete, hole diameter, and GPS coordinates. Also the installation date, the installing contractor, and the current property owner.

When a property owner (or contractor or developer) is ready to install a fence, the style, material, and finish of the fence is selected. The owner provides a fabricator with the file number of the archived data, and the details of the selected design. The fabricator then obtains the data from the central archive, and also provides the archive with additional information, including the material and design of the fence, and the manufacture and projected installation dates. The fabricator manufactures and marks the fence components in the selected design and according to the data obtained from the archive, and ships them to the location of the property.

An installer uncovers the tops of the sleeves, and places the posts in the corresponding sleeves, then attaches each panel to the appropriate posts, referring to the markings placed by the manufacturer on the fence components and the UI of each post sleeve to correctly position each post and panel. The fence components can be installed by a contractor working for the developer or property owner, or a reasonably handy property owner can do the installation, unassisted.

In cases where the fence is installed by a developer when the property is first subdivided and developed, installation may be days, weeks, or months after installation of the post sleeves. The developer may install fence panels only along property lines around the perimeter of a development, while leaving the remaining post sleeves unoccupied. If fences are not installed by the developer, some who later purchase lots may elect to install fences, while others may not. However, even years later, a second or third owner can choose to install a fence, and the sleeves will be waiting and the data still available at the archive. Furthermore, because the sleeves are installed according to the original survey when the property is subdivided, they will appear on later survey maps and in the legal description of the property, and can be used as reference markers to correctly define boundaries thereafter. Thus, installing the post sleeves can enhance the value of the property, regardless of whether a fence is actually installed at that time.

When an individual purchases a lot, the data is already on file, and the owner can consult with a contractor, a fabricator, or refer to manufacturers' web sites to select a fence design, materials, finish, etc. The user can provide a file number or other information to identify the specific property, and the consultant or website software can then download the pertinent data from the central archive and produce a rendering of the property, showing a fence in the selected design, or showing various options for the user to choose from. Once the user has made a selection, the order can be placed immediately, by any appropriate means, including by telephone, email, web order, etc.

When a customer orders the panels for a fence, the fabricator enters the necessary data into its optimization system. If the fence style is one of a number of designs that are offered as standard by the fabricator, information specific to that style can be already present in the system, so that when an operator enters the information specific to the post sleeves of the customer's property, the system automatically calculates the numbers and dimensions of all the individual parts of each panel to be manufactured.

At any given time, the fabricator may have dozens of fence orders in queue. Lumber enters the system in random length boards according to the lengths of the stems from which they were milled, or as mill shorts. The system carries a running list of material yet to be cut for all the pending orders. As each board is fed into the machinery, the system scans it to determine its dimensions and to detect flaws, then calculates which of the list of pieces can be cut from the board to result in the least amount of waste, cutting the board accordingly. The system can also be configured to consider the structural strength necessary for a given piece. Thus, for example, a rail that will eventually span between two posts and support much of the weight of the panel, as well as wind load, etc., may need to be substantially clear of knots and checks, while a slat of a lattice, which will never be required to support more than a minimal load, can have a number of structural flaws, provided they don't detract from its appearance.

After cutting, each piece is marked with a code that indicates the job, panel, and component, and is then sorted, at least by job. Marking can be by any of a number of known means, including stamping, laser, spray, etc. One of the fence rails of each panel is also marked at each end with the UI of the respective post sleeves between which that panel is to be installed. During installation, the installer will refer to this marking to determine the location of the particular panel. If necessary, the marked portions can be covered by a clear wax or finish to prevent stain or paint that is later applied from obscuring the markings.

According to one embodiment, assembly workers assemble all the components of each panel, referring to the markings to correctly assemble the components. The markings can be in a computer-readable format, such as bar codes, so that if a worker is unsure of where a particular piece of material belongs, its marking can be passed under a reader, and the system will indicate the panel and location of the piece. According to another embodiment, the system automatically assembles at least portions of some or all of the panels, with workers doing final assembly.

Following assembly, the components of the fence are finished, by dipping or spraying each component with a stain or paint finish selected by the customer. Once the finish has cured, the components are crated or banded for shipment. The panels are preferably stacked and banded in order of position in the finished fence, so that the installer can place a stack of panels on a cart or flatbed truck and, moving along the fence line, drop the correct panel at each position, in order. In most cases, there will be little or no waste at the fence site, apart from packing material, which itself will be minimal.

Over time, fence posts and panels will be damaged or will deteriorate. Replacement panels can be easily obtained. Either the property owner or the manufacturer can obtain the data from the repository, including style, material, and finish. The customer merely indicates which panels and which posts need to be replaced, and the manufacturer can produce an identical panel from the original data, which is then shipped to the customer. If posts need to be replaced, the old posts are pulled from the sleeves, which are then cleaned, if necessary, and the new posts are dropped in. The panels are then installed as previously described.

While fabrication of wood panels is described above, other materials, such as plastics and metal, can also be processed similarly. This is especially true where, because of normal operations in related or unrelated industries, there is a surplus of materials that are normally scrapped, but that could be used in fence panels.

According to an embodiment, the end consumer accesses a software program that provides all the necessary tools to select a fence design and place an order. The program may be accessed, for example, via the internet, at a retail location, or with the assistance of a contractor. The user can input an address or some other identifier such as tax lot number etc. If data related to that property is present in the central repository or in other accessible records, the program then populates with a 2 or 3 dimensional rendering of the property, according to the information and detail that is available. The rendering includes the current fence or previously installed post sleeves. The user selects materials, color and finish, style, and other details, all of which are displayed and described in the rendering, as they are selected. Information about manufacturers is provided, such as delivery times and prices. A running subtotal of the cost of the fence is provided, together with costs (or estimates) of delivery, installation, and tax, together with a total cost. The user is thus able to select and order a fence according to personal criteria, without outside assistance or interference, or whatever level of assistance or advice is desired. Once an order is placed, the system updates the central repository accordingly.

In a similar fashion, a user can select and order an individual replacement panel, inputting the UI or identifying the particular panel from the 3D model. Additionally, the consumer can log on to the website, or otherwise access the system from time to time, to update the database to reflect changes, e.g., new stain colors, contractors used, etc., or to access the actual plot plan for future reference.

While devices configured for use in installing post sleeves may be recited in the claims, unless specifically recited as an element, post sleeve is not to be read as a claim limitation, i.e., if a claim reads on a device with a post sleeve attached, it will also read on the same device without the post sleeve.

References in the specification and claims to movement in or parallel to ordinal axes, such as the X, Y, or Z axis, do not refer to specific axes, but to three mutually orthogonal axes, except that reference to the Z axis can be understood as referring in particular to a vertical axis, while X and Y axes can be understood as lying in a horizontal plane. Reference to orientation is to be understood as referring to an angle of rotation around a vertical axis.

The term position refers to the location of an element in three orthogonal axes, unless explicitly limited further.

The term post is used in the specification and claims in relation to a vertical support member, such as is used, for example, to support a fence or sign, and is not to be construed as meaning subsequent to.

The term post bracket is used as a generic term to refer to hardware configured to support a post at or above a surface, including, for example, a bolt pattern plate, a "U" bracket, a pier bracket, and a post bracket. The term post receiver is used in the claims to refer generically to structures configured to receive and support a post, including, for example, prefabricated post sleeves, post brackets, and poured-in-place post sleeves (made using a post hole mold).

Adjustments made before coupling the post sleeve to a device can be read as adjusting the post sleeve. The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

Elements of the various embodiments described above can be combined, and further modifications can be made, to provide further embodiments without deviating from the spirit and scope of the invention. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

The invention claimed is:

1. A post positioning device, comprising:
    a positioning element sized to be received into a cavity of a post sleeve;
    an index coupled to the positioning element so as to extend from an opening of the cavity while the positioning element is received in the cavity, the index having a graduated scale extending along a portion of its length, and the positioning element being configured to support the index in alignment with a longitudinal axis of the cavity.

2. The device of claim 1 wherein the positioning element is a first positioning element, configured to be received in a lower end of the cavity, the device further comprising a second positioning element configured to be received at least partially within the opening of the cavity, the first and second positioning elements together configured to support the index in alignment with a longitudinal axis of the cavity.

3. The device of claim 2, comprising a support column coupled at a first end to the first positioning element and configured to be supported at a second end by the second positioning element, the index being positioned within the support column and configured to telescope therefrom to extend from the opening of the cavity.

4. The device of claim 1 wherein the positioning element includes a weight configured to act as ballast to assist in vertical alignment of the post sleeve during installation.

5. The device of claim 1 wherein the positioning element includes a vibrator configured to assist in removal of air from concrete poured as a footing around the post sleeve during installation.

6. The device of claim 2 wherein the second positioning element includes an adaptor cap configured to fit snugly into the opening of the cavity.

7. A device comprising:
   a cross beam having first and second ends;
   a first support structure configured to support the first end of the cross beam in a position corresponding to a location of a first post of a fence;
   a second support structure configured to support the second end of the cross beam in a position corresponding to a location of a second post of the fence;
   a ground scanner coupled to the cross beam and configured to determined a contour of a ground surface extending along a line between the first and second support structures.

8. The device of claim 7 wherein the crossbeam comprises a track extending longitudinally on the cross beam, and wherein the ground scanner is configured to travel along the track of the cross beam, and to detect a value corresponding to a distance from the ground scanner to the ground surface.

9. The device of claim 7 wherein the cross beam is pivotably coupled to the first support structure, and the second support is configured to receive the cross beam at any vertical position within a range of vertical positions, such that the cross beam can be positioned to extend horizontally between the first and second support structures while relative elevations of the locations of the first and second posts of the fence are within a range corresponding to the range of vertical positions.

10. The device of claim 9 wherein the second support structure includes means for determining a difference in relative elevations of the locations of the first and second posts of the fence on the basis of a vertical position at which the cross beam is received.

11. The device of claim 7 comprising means for determining a distance between the locations of the first and second posts of the fence.

12. The device of claim 7 comprising means for determining relative orientations of the first and second posts of the fence.

13. The device of claim 7 wherein the first support structure comprises:
   a sleeve insert configured to be received in a first post sleeve positioned at the location of the first post of the fence;
   a support post coupled to the sleeve insert so as to extend from the sleeve insert in alignment with the first post sleeve, and so as to be rotatable around a longitudinal axis of the first post sleeve; and
   a bracket coupled to the support post and configured to receive the first end of the cross beam.

14. The device of claim 13 wherein:
   the first support structure includes a scale positioned and calibrated to display a value corresponding to an orientation of the first post sleeve relative to the cross beam; and
   the cross beam includes a scale positioned and calibrated to display a value corresponding to a distance from the first post sleeve to the second post sleeve.

15. The device of claim 13 wherein the second support structure comprises:
   a sleeve insert configured to be received in a second post sleeve positioned at the location of the second post of the fence;
   a reference post coupled to the sleeve insert so as to extend from the sleeve insert in alignment with the second post sleeve, and so as to be rotatable around a longitudinal axis of the second post sleeve; and
   first and second arms coupled to the reference post and spaced apart a distance sufficient to receive the second end of the cross beam therebetween.

16. The device of claim 15 wherein the second support structure includes scales positioned and calibrated to display a value corresponding to an orientation of the second post sleeve relative to the cross beam, and a value corresponding to a vertical position of the cross beam relative to the second post sleeve.

17. A method, comprising:
   positioning a quantity of uncured concrete in a posthole;
   positioning a post positioning device into a cavity of a premanufactured post sleeve the post positioning device configured to receive an index;
   positioning an index in the post positioning device such that the index extends from an opening of the cavity, aligned with a longitudinal axis of the cavity;
   positioning the post sleeve in the posthole so that the post sleeve floats in the quantity of uncured concrete;
   before the uncured concrete hardens, adjusting a position of the post sleeve in the posthole to plumb the index; and
   removing the index from the posthole.

18. The method of claim 17, comprising, prior to removing the index, determining a distance between the index and an additional index extending from an opening of an additional post sleeve.

19. The method of claim 17, comprising, prior to removing the index, determining an elevation of the post sleeve relative to an additional post sleeve on the basis of a vertical scale positioned along a portion of the index.

20. The method of claim 17 wherein the adjusting a position comprises adjusting an orientation of the post sleeve in the posthole.

21. A method, comprising:
   supporting a first end of a cross beam in a position corresponding to a location of a first post of a fence;
   supporting a second end of the cross beam in a position corresponding to a location of a second post of the fence, at an elevation that is equal to an elevation of the first end of the cross beam; and
   mapping a ground surface relative to the cross beam along a line between the locations of the first and second posts of the fence.

22. The method of claim 21 wherein the mapping a ground surface comprises moving a ground scanner along a track of the cross beam and detecting changes in elevation of the ground surface along the line.

23. The method of claim 21 wherein:
the supporting a first end comprises:
  placing a sleeve insert of a first support structure in a first post sleeve that is positioned at the location of the first post of the fence, and
  coupling the first end of the cross beam to a support post of the first support structure; and
the supporting a second end comprises:
  placing a sleeve insert of a second support structure in a second post sleeve that is positioned at the location of the second post of the fence,
  adjusting an elevation of the second end of the cross beam to place the second end at the elevation that is equal to the elevation of the first end, and
  coupling the second end of the cross beam to a reference post of the second support structure.

* * * * *